(12) United States Patent
Dhinojwala et al.

(10) Patent No.: US 9,827,709 B2
(45) Date of Patent: Nov. 28, 2017

(54) ADHESIVE ATTACHMENT DISCS

(71) Applicants: Ali Dhinojwala, Akron, OH (US);
Vasav Sahni, St. Paul, MN (US);
Dharamdeep Jain, Akron, OH (US)

(72) Inventors: Ali Dhinojwala, Akron, OH (US);
Vasav Sahni, St. Paul, MN (US);
Dharamdeep Jain, Akron, OH (US)

(73) Assignee: The University of Akron, Akron, OH (US)

( * ) Notice: Subject to any disclaimer, the term of this patent is extended or adjusted under 35 U.S.C. 154(b) by 64 days.

(21) Appl. No.: 14/649,665

(22) PCT Filed: Dec. 23, 2013

(86) PCT No.: PCT/US2013/077477
§ 371 (c)(1),
(2) Date: Jun. 4, 2015

(87) PCT Pub. No.: WO2014/100811
PCT Pub. Date: Jun. 26, 2014

(65) Prior Publication Data
US 2015/0328831 A1 Nov. 19, 2015

Related U.S. Application Data

(60) Provisional application No. 61/740,565, filed on Dec. 21, 2012.

(51) Int. Cl.
*B32B 3/00* (2006.01)
*B29C 65/52* (2006.01)
(Continued)

(52) U.S. Cl.
CPC .............. *B29C 65/525* (2013.01); *C09J 5/00* (2013.01); *C09J 7/0239* (2013.01);
(Continued)

(58) Field of Classification Search
CPC . B29C 65/525; C09J 2201/24; C09J 2475/00; C09J 5/00; C09J 7/0239
See application file for complete search history.

(56) References Cited

U.S. PATENT DOCUMENTS 5,507,909 A * 4/1996 Rollins ............. A61F 13/15593
118/325
6,133,173 A * 10/2000 Riedel ................. A61F 13/0273
442/151

(Continued)

*Primary Examiner* — Elizabeth Mulvaney
(74) *Attorney, Agent, or Firm* — Renner Kenner Greive Bobak Taylor & Weber

(57) ABSTRACT

The present invention is directed to synthetic attachment discs made from adhesive nanofibers and/or microfibers that are capable of attaching long fibers to a wide variety of surfaces, and related methods for forming and using them. The synthetic attachment discs of the present invention use very little material relative to prior art systems, while producing a very strong attachment force. Experimental and theoretical evidence are provided to confirm the advantages of thousands of micron-size 'staple-pins' and their low peeling angles to enhance the adhesive forces required to peel the synthetic attachment discs. The present invention provides a unique strategy for designing new adhesives that use very little material for various biomedical and material science applications.

24 Claims, 17 Drawing Sheets

(51) Int. Cl.
*C09J 7/02* (2006.01)
*C09J 5/00* (2006.01)
*F16B 11/00* (2006.01)
B29K 77/00 (2006.01)
B29K 75/00 (2006.01)
B29L 31/00 (2006.01)
B29K 705/02 (2006.01)

(52) U.S. Cl.
CPC ........ *F16B 11/006* (2013.01); *B29K 2075/00* (2013.01); *B29K 2077/00* (2013.01); *B29K 2705/02* (2013.01); *B29L 2031/727* (2013.01); *C09J 2201/24* (2013.01); *C09J 2475/00* (2013.01); *Y10T 428/21* (2015.01)

(56) References Cited

U.S. PATENT DOCUMENTS

2003/0026967 A1* 2/2003 Joseph ................ D01F 6/52
428/292.1
2006/0153904 A1* 7/2006 Smith ................ A61L 15/225
424/448

* cited by examiner

Pre-peeling

Post-peeling

Pre-peeling

Post-peeling

ADHESIVE ATTACHMENT DISCS

CROSS REFERENCE TO RELATED APPLICATIONS

This application claims the benefit of International Application Number PCT/US2013/077477 entitled "Adhesive Attachment Discs," which claims the benefit of U.S. provisional patent application Ser. No. 61/740,565 entitled "Bio-Inspired Spider Silk Based Adhesive Attachment Discs," filed Dec. 21, 2012, the disclosures of which are incorporated herein by reference in their entirety.

REFERENCE TO GOVERNMENT SUPPORT

The invention was developed at least in part with the support of National Science Foundation grant number DMR-1105370. The government may have certain rights in the invention.

FIELD OF THE INVENTION

The present invention is in the field of polymer adhesives, particularly to the use of synthetic attachment discs of adhesive nanofibers to secure such things as fibers, threads, line, tendon fibers, ligament fibers, and like materials to surfaces.

BACKGROUND OF THE INVENTION

In certain areas of endeavor it is sometime necessary to attach long fibers such as a thread, line or glass fibers, carbon fibers, natural and synthetic fibers or animal ligament or tendon fibers to a relatively flat surface and there have developed a variety of methods for doing so. Some methods known in the art involve placing a fastener over and/or through the fiber and into the substrate. While this method does secure the fiber to the substrate, it also damages the substrate and weakens the fiber at the place it is secured to the substrate, particularly if the fastener passes through the fiber. Moreover, this method can be difficult or in effective where the substrate is either too hard to easily insert a fastener or too soft to hold the fastener, where the fiber or substrate are fragile, or where the fiber or substrate should not be damaged.

Other methods known in the art involve the use an adhesive, usually as a single glob of adhesive over the fiber to hold it to the substrate. In these methods, far more adhesive is used than is actually necessary to secure the fiber to the substrate, unnecessarily increasing the costs. Further, many of these adhesives can take a significant amount of time to dry and/or fully cure and may not hold well until that time. Also, many adhesives are not suitable for biological applications as they are toxic.

To take a somewhat broader view, some guidance may be gained from recent work done with spiders. It has been found that dragline silk (major ampullate silk) fibers that the orb weaving spiders use for locomotion and to build web frames is attached to a range of substrates such as wood, trees, and/or concrete using silk nanofibers produced by the pyriform glands on the underside of the spider's abdomen. The pyriform silk is secreted by hundreds of tiny spinnerets on the abdomen surrounding the spinneret used for spinning the dragline silk. An attachment disk of pyriform silk nanofibers is produced by movement of the anterior lateral spinnerets over the substrate, pinning the dragline silk to the substrate as it is extruded by the spinneret. (See FIGS. 1A, 1B). In fact, it has been found that these attachment discs are so strongly held on the surface that the dragline silk fibers will break before these discs will detach from the surface. It is believed that the softness and the extensibility of the hundreds of pyriform fibers attaching the dragline silk threads, combined with low peeling angles contribute to the strength of these attachment discs, which use very little material, yet produces a very strong attachment force.

What is needed in the art is a synthetic attachment disc (and related methods of forming and using them) for attaching long fibers to a wide variety of surfaces, which uses very little material, while producing a very strong attachment force.

SUMMARY OF THE INVENTION

The present invention is directed to a synthetic attachment disc made from adhesive nanofibers or microfibers that is capable of attaching a long fiber to a wide variety of surfaces, and related methods for forming and using them. The synthetic attachment discs of the present invention use very little material relative to prior art systems, while producing a very strong attachment force.

In a first aspect, the present invention is directed to a method of attaching a fiber, thread, or other long, thin material to a surface comprising: (A) placing a length of a fiber on a surface thereby defining a first area of the surface on a first side of the fiber and a second area of the surface on an opposite side of the fiber; (B) providing an adhesive fiber generating apparatus, wherein the output of the adhesive fiber generating apparatus is oriented to generate one or more adhesive fibers over the fiber and the first and second areas of the surface; (C) generating one or more adhesive fibers over the fiber wherein the adhesive fibers are generated onto the first and second areas of the surface and across the fiber; and (D) moving one of the surface and the output of the adhesive fiber generating apparatus relative to the other in a direction substantially parallel with the orientation of the fiber on the surface wherein the one or more adhesive fibers further comprise a plurality of segments running between the first and the second areas of the surface and across the fiber, thereby attaching the fiber to the surface.

In some embodiments, the method of the present invention may include any of the embodiments described above wherein, the fiber comprises a polymer selected from the group consisting of natural and synthetic fibers such as nylon, cotton, wool, silkworm silk, natural dragline silk, polyester, polyethylene, carbon fiber, glass fiber, synthetic spider silk and combinations thereof. In some embodiments, the method of the present invention may include any of the embodiments described above wherein the fiber has a diameter of from about 1 μm to about 2000 μm.

In some embodiments, the method of the present invention may include any of the embodiments described above wherein the adhesive fiber generating apparatus generates the one or more adhesive fibers using a method selected from the group consisting of electrospinning, Nanofibers by Gas Jet (NGJ), melt blowing, rotary jet spinning, gas jet fibers (GJF) and combinations thereof.

In some embodiments, the method of the present invention may include any of the embodiments described above wherein the adhesive fiber generating apparatus generates the one or more adhesive fibers by electrospinning.

In some embodiments, the method of the present invention may include any of the embodiments described above wherein the one or more adhesive fibers is generated from a polymer selected from the group consisting of thermoplastic polyurethane, polyesters, natural silk fibroin, synthetic spider silk, polyvinyl alcohol, polymethacrylates, polylactic acid (PLA), collagen-polyethylene oxide blend, silk-polyethylene oxide blend, chitosan, gelatin, polyethylene glycol (PEG), poly(lactide-co-glycolide) (PLGA), polycaprolactone, polyethylene-co-vinyl acetate (PEVA) and combinations thereof. In some embodiments, the method of the present invention may include any of the embodiments described above wherein the one or more adhesive fibers is generated from a thermoplastic polyurethane.

In some embodiments, the method of the present invention may include any of the embodiments described above wherein the one or more adhesive fibers has a diameter of from about 10 nm to about 100 µm. In some embodiments, the method of the present invention may include any of the embodiments described above wherein the one or more adhesive fibers has a surface energy of from about 10 to about 40 mJ/m2.

In some embodiments, the method of the present invention may include any of the embodiments described above wherein the surface is selected from the group consisting of aluminum, stainless steel, silicon, glass, plastic, bone, skin and combinations thereof. In some embodiments, the method of the present invention may include any of the embodiments described above wherein the surface has a surface energy of from about 10 to about 3000 mJ/m2.

In some other embodiments, the method of the present invention may include any of the embodiments described above wherein the mean distance between the segments running between the first and the second areas of the surface and across the fiber is from 0.5 µm to about 5000 µm.

In some embodiments, the method of the present invention may include any of the embodiments described above wherein the one of the surface and the output of the adhesive fiber generating apparatus moves relative to the other at a speed of from about 0.1 mm/second to about 1000 mm/second.

In a second aspect, the present invention is directed to a synthetic attachment disc for attaching a fiber or other long, thin material to a surface comprising a plurality of synthetic adhesive fibers extending from a first area of a surface adjacent to a first side of a fiber to be attached to a surface, across the fiber, and onto a second area of the surface substantially adjacent to a second side of the fiber.

In some embodiments, the synthetic attachment disc of the present invention may include any of the embodiments described above wherein the fiber comprises a polymer selected from the group consisting of nylon, cotton thread, natural and synthetic fibers such as nylon, cotton, wool, silkworm silk, natural dragline silk, polyester, polyethylene, carbon fiber, glass fiber, synthetic spider silk, and combinations thereof. In some embodiments, the synthetic attachment disc of the present invention may include any of the embodiments described above wherein the fiber has a diameter of from about 1 µm to about 2000 µm.

In some embodiments, the synthetic attachment disc of the present invention may include any of the embodiments described above wherein the plurality adhesive fibers have a surface energy of from about 10 to about 40 mJ/m2. In some embodiments, the synthetic attachment disc of the present invention may include any of the embodiments described above wherein the plurality of synthetic adhesive fibers are comprised of a polymer selected from the group consisting of thermoplastic polyurethane, polyesters, natural silk fibroin, synthetic spider silk, polyvinyl alcohol, polymethacrylates, polylactic acid (PLA), collagen-polyethylene oxide blend, silk-polyethylene oxide blend, chitosan, gelatin, polyethylene glycol (PEG), poly(lactide-co-glycolide) (PLGA), polycaprolactone, polyethylene-co-vinyl acetate (PEVA) and combinations thereof. In some embodiments, the synthetic attachment disc of the present invention may include any of the embodiments described above wherein the plurality of synthetic adhesive fibers are comprised of a thermoplastic polyurethane.

In some embodiments, the synthetic attachment disc of the present invention may include any of the embodiments described above wherein the plurality of synthetic adhesive fibers have a mean diameter of from about 10 nm to about 100 µm. In some embodiments, the synthetic attachment disc of the present invention may include any of the embodiments described above wherein the mean distance between each one of the plurality of synthetic adhesive fibers is from 0.5 µm to about 5000 µm.

In some embodiments, the synthetic attachment disc of the present invention may include any of the embodiments described above wherein the ratio of the mean length of the plurality of synthetic adhesive fibers to diameter of the fiber is from about 10 to about $10^6$. In some embodiments, the synthetic attachment disc of the present invention may include any of the embodiments described above wherein the plurality of synthetic adhesive fibers are segments of a coil formed by one or more synthetic adhesive fibers.

In a third aspect, the present invention is directed to a synthetic attachment disc for attaching a fiber, thread, or other long, thin material to a surface formed using the methods of the first aspect of the invention.

BRIEF DESCRIPTION OF THE DRAWINGS

For a more complete understanding of the features and advantages of the present invention, reference is now made to the detailed description of the invention along with the accompanying figures in which:

FIG. 3 shows the main components of the set-up which includes a capillary tube filled with polymer solution to be electrospun, a high voltage source for creating potential difference between capillary tip and collector, an air supply used to control jet stability and a velocity controlled moving stage upon which the aluminum substrate with the nylon thread are placed to collect the fibers. The electrified jet spins the synthetic attachment discs on the nylon fiber as the collector stage moves at a predetermined velocity.

FIG. 4A is an optical image and FIG. 4B is an SEM depicting a synthetic disc of adhesive nanofibers spun on a nylon thread at a collector stage velocity of about 0.1 cm/s, according to at least one embodiment of the present invention. FIG. 4C is an optical image and FIG. 4D is an SEM depicting a synthetic disc of adhesive nanofibers spun on a nylon thread at a collector stage velocity of about 1 cm/s, according to at least one embodiment of the present invention. The scale bars for optical images (FIGS. 4A and 4C) and SEM images (FIGS. 4B and 4D) are 1000 μm and 100 μm, respectively.

FIGS. 11 A-D are a series diagrams schematically illustrating a pre-peeling and post-peeling scenario for synthetic attachment discs prepared according to at least one embodiment of the present invention. FIG. 11A and FIG. 11B show the top-view, while

FIGS. 13A and 13C are perfluoro plasma (FIG. 13A) and oxygen plasma (FIG. 13C) treated aluminum substrates, while FIG. 13B is an untreated aluminum substrate. The discs shown in FIGS. 13A-C were prepared at a collector stage velocity of 0.1 cm/s of collector stage and peeled at 1 mm/s. The scale bars for FIGS. 13A-C is 1000 μm.

FIG. 16A shows peeling behavior which starts as a V zone formation, but later narrows down and resembles the behavior as seen in FIG. 13C while FIG. 16B depicts the peeling behavior resembling the control substrate. Such variation in peeling behavior is not often seen but could be due to a loss of effectiveness of the oxygen plasma treatment on the substrates, leading to behavior similar to the untreated substrates. The scale bar for the figures is 1000 μm.

FIG. 17-C are a series of images of synthetic attachment discs prepared according to at least one embodiment of the present invention showing fibers of Nylon 6 electrospun to create pendulum ring structures on underlying nylon thread.

DETAILED DESCRIPTION OF THE ILLUSTRATIVE EMBODIMENTS

Figure 1A:
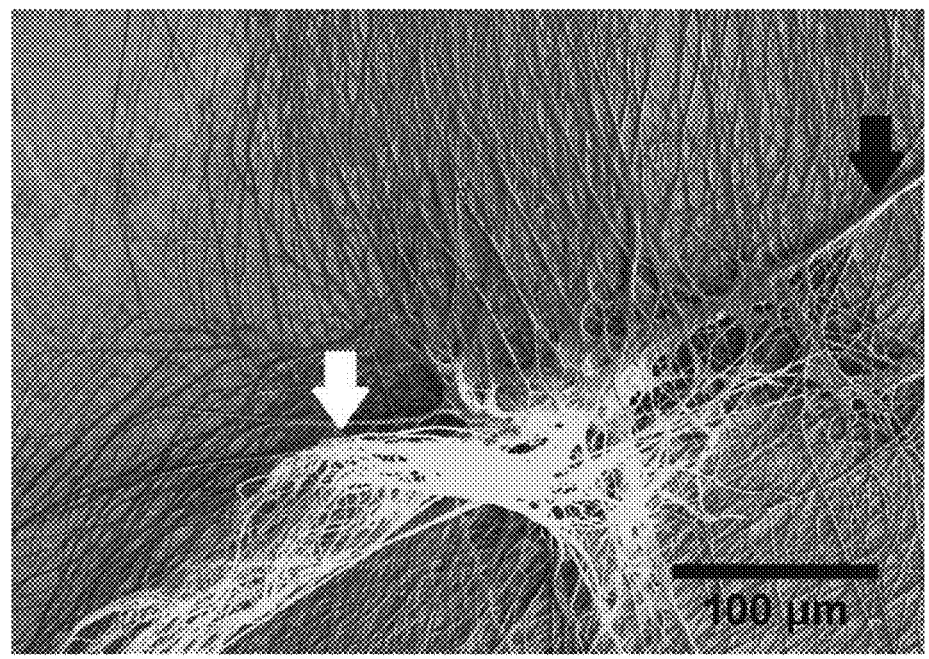
FIGS. 1A-B shows a Scanning Electron Micrograph (SEM) (FIG. 1A) and a confocal image (FIG. 1B) depicting an attachment disc made by *Achaearanea tepidariorum*. The black arrows show the underlying dragline silk fiber on which the pyriform silk, shown with a white arrow, has been deposited. The scale bar is 100 µm. The figures have been adapted from V. Sahni, J. Harris, T. Blackledge, A. Dhinojwala, *Nat. Commun.* 2011, 3, 1106, the disclosure of which is incorporated herein by reference in its entirety.
Figure 1B:
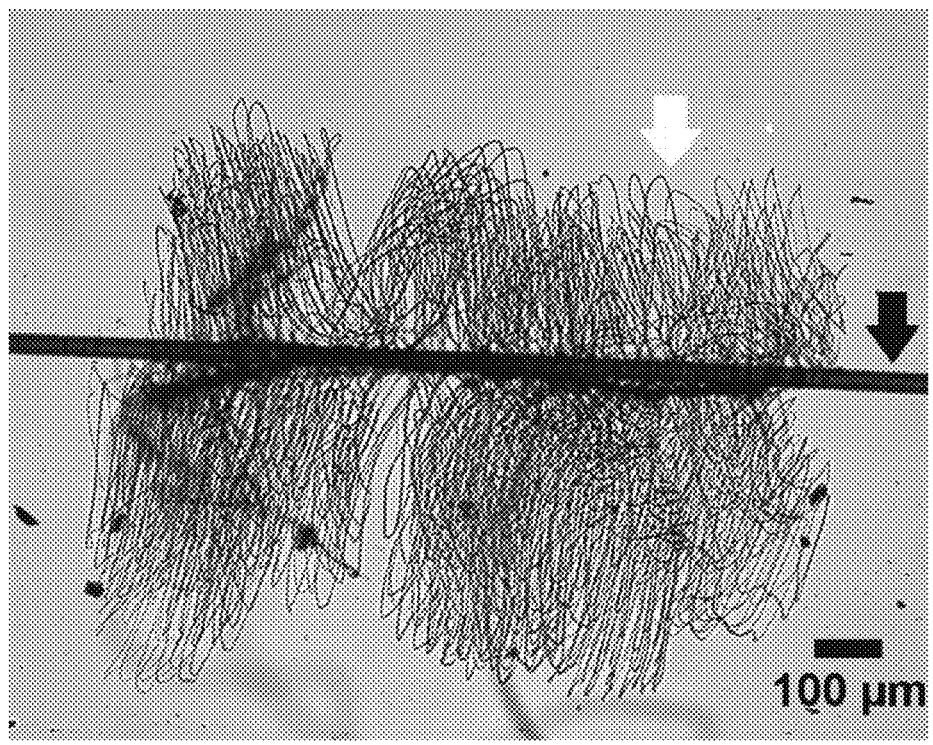
Figure 2:
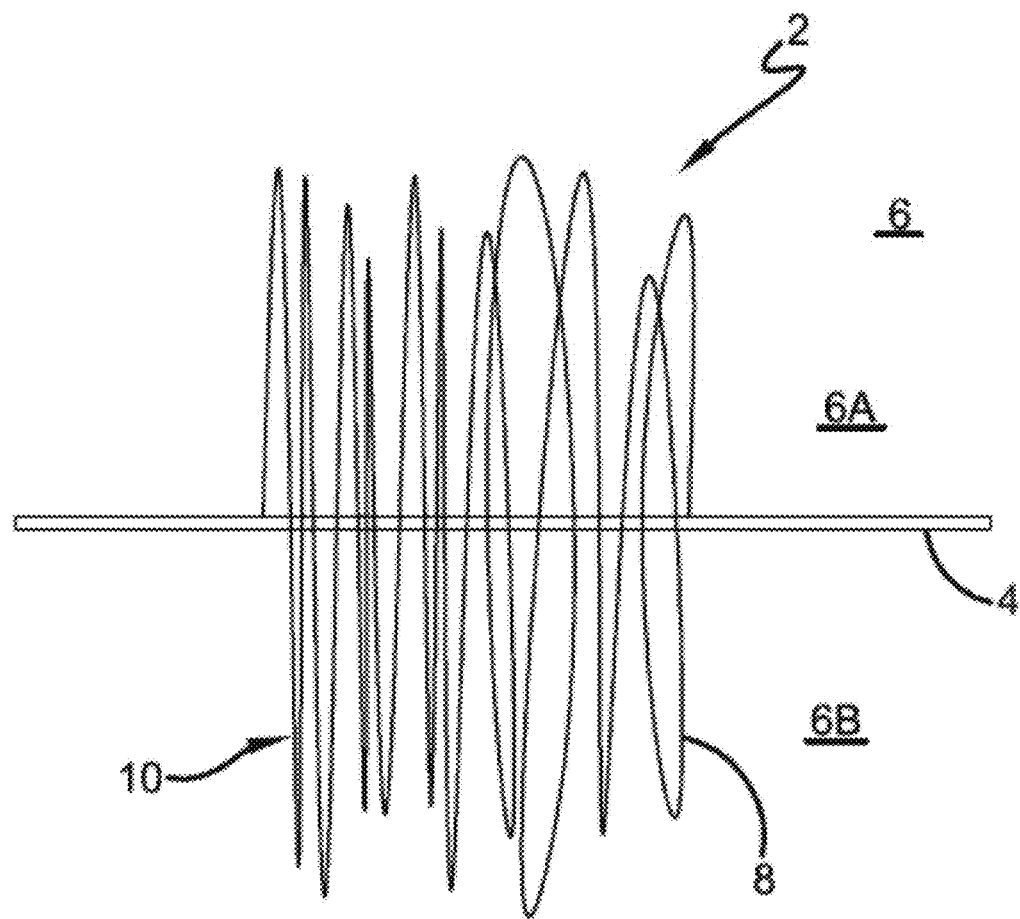
FIG. 2 is a schematic representation of a synthetic attachment disc according to at least one embodiment of the present invention.

The present invention is directed to a novel synthetic attachment disc 2 (and related methods of forming and using them), for attaching long fibrous material 4 (such as a thread, line, glass fibers, carbon fibers, natural and synthetic fibers such as cotton, nylon, wool, silkworm silk, dragline silk, polyesters, polyethylene or biomaterials such as animal ligament of tendon fibers) to a wide variety of substrates 6. These synthetic attachment discs use very little material while producing a very strong attachment force. An example of a synthetic attachment disc 2 according to at least one embodiment of the present invention is shown in FIG. 2. It is comprised of numerous adhesive nanofibers or microfibers (adhesive fibers) 8 that are deposited on top of a long fiber 4, which is to be attached to a substrate 6. The adhesive fibers 8 are preferably synthetic nanofibers or microfibers.

They are significantly longer than they are wide and run from the substrate on one side of the long fiber 6A (where they adhere), across the long fiber 4 (being attached to the substrate) and onto the substrate on the opposite side 6B (where they also adhere). (See, FIG. 2) Collectively, adhesive fibers 8 form an adhesive disc 2 that secures the long fiber 4 to the substrate 6.

The synthetic attachment discs 2 of the present invention may be used to secure any material or object of a suitable size and shape, but the material/object is preferably a long fiber, thread, line or other thread-like or fiber-like material having a length which is many times its width. For convenience, the material to be attached will generally be referred to herein as a "fiber" or as the "long fiber" 4, but it should be understood that the material to be secured by the synthetic attachment disc 2 of the present invention is not limited to fibers, but may also include such things as plastic, paper, glass, and wounds. The object/material to be attached with the synthetic attachment disc, however, should have a well-defined fiber structure and/or be a thin material with diameter ranging from 1 μm to 2000 μm. In some embodiments, fibers and/or thin material to be attached may have a mean diameter of from 2 μm to 1000 μm. In some embodiments, fibers and/or thin material to be attached may have a mean diameter of from 10 μm to 500 μm. In some embodiments, fibers having diameter more than 2000 μm may be difficult to secure and maintain the integrity of the system. Additionally, materials like metals may be difficult to attach using the polymeric electrospun fibers.

In some embodiments, the synthetic attachment disc 2 of the present invention may be used to secure tendon or ligament fibers to bone. In some embodiments, the material to be secured by the synthetic attachment disc 2 of the present invention may be used to secure a cotton or nylon thread. In some embodiments, the material to be secured by the synthetic attachment discs of the present invention (the long fiber 4) may be carbon fibers, glass fibers, skin, dragline silk, natural and synthetic fibers other than cotton and nylon.

Adhesive fibers 8 may be made from any suitable natural or synthetic polymer or other material capable of being formed into nanofibers or microfibers and adhering to the desired substrate 6. Adhesive fibers 8 are able to adhere to the substrate using a variety of different mechanisms. In most embodiments of the present invention, adhesive fibers 8 adhere to the substrate 6 due to electrostatic forces and/or Van der Waals forces acting between adhesive fibers 8 and substrate 6. As those of skill in the art will appreciate, the strength of these forces will be determined by such things as the surface energies of adhesive fibers 8 and the substrate 6, the weight of the adhesive fibers 8, the diameter and length of the adhesive fibers 8, the surface area to volume (and/or weight) ratio of the adhesive fibers 8, and the spacing between the adhesive fibers 8. In some embodiments, adhesive fibers 8 have a surface energy of from about 10 mJ/m$^2$ to about 40 mJ/m$^2$. In most embodiments of the present invention, it is preferred that the adhesive fibers 8 have a high surface area-to-volume ratio, so that electrostatic and Van der Waals forces can more easily adhere them to the substrate.

In other embodiments, adhesive fibers 8 may contain some residual solvent when they are deposited on the substrate, making them somewhat "sticky," and will adhere to the substrate as they dry. In some embodiments, the polymer and/or other substances used to form the adhesive fibers 8 have a sufficiently high intrinsic adhesion energy value with respect to a particular substrate to ensure adherence. In some embodiments, adhesion of the fibers to the substrate may be accomplished and/or assisted by such things as adhesives and additives, chemically active substrates, etching of substrates, surface modification of fibers (chemical/physical treatments).

Particularly where electrostatic and Van der Waals forces are the primary means of attachment, the adhesive fibers 8 of the present invention are preferably very fine, having a mean diameter of from a few nanometers to about 1000 nm. While adhesive fibers 8 may be referred to herein in as nanofibers, it should be appreciated that this is not intended to be limiting and in some embodiments of the present invention the adhesive fibers may be as large as 100 micrometers in diameter. In some embodiments, adhesive fibers 8 have a mean diameter of from about 10 nm to about 1000 nm. In some embodiments, adhesive fibers 8 have a mean diameter of from about 100 nm to about 1000 nm. In some embodiments, adhesive fibers 8 have a mean diameter of from about 200 nm to about 7000 nm. In some embodiments, adhesive fibers have a mean diameter of from about 700 nm to about 1000 nm. In some embodiments, adhesive fibers 8 have a mean diameter of from about 1 μm to about 10 μm.

The actual diameter and length of adhesive fibers 8 will depend upon the composition of the adhesive fibers 8 and the substrate 6, among other factors, but as should be apparent, adhesive fibers 8 should be many times longer than their diameter. In some embodiments, the length of adhesive fibers may be from about 10 times to about $10^6$ times their diameter. In some embodiments, the length of adhesive fibers 8 may be from about $10^2$ times to about $10^4$ times their diameter. In some embodiments, the length of adhesive fibers 8 may be from about $10^2$ times to about $10^3$ times their diameter. In some embodiments, the length of the adhesive fibers 8 may be $10^2$ times their diameter.

As will be discussed below, adhesive fibers 8 may, in some embodiments, be formed in whole or in part from a single nanofiber or microfiber, which forms a series of loops having segments 10 that lay across the long fiber 4 (to be secured to the substrate 6), adhering to the substrate on both sides of the fiber 6A, 6B. (See FIGS. 2, 3). Other methods of forming adhesive fibers 8 and placing them across the long fiber 4 are also possible. Accordingly, adhesive fibers 8 may be any nanofibers or microfibers that will adhere to the substrate and that run from the substrate on one side of the long fiber 6A, across the long fiber 4, to the substrate on the opposite side of the fiber 6B including, without limitation, discrete adhesive fibers, portions of a longer adhesive fibers, or segments 10 of one or more loops of an adhesive nanofiber or microfiber. (See FIGS. 2 and 3).

Each of adhesive fibers 8 will have a diameter and a length. As used herein, the terms "length of the adhesive fiber" and/or "adhesive fiber length" are interchangeable and refer to the length of a discrete adhesive fiber, portion of a longer adhesive nanofiber, or segment of a loop of an adhesive nanofiber, as measured from the place where the adhesive nanofiber first contacts the substrate on one side of the fiber being secured to the substrate to the last place where the fiber leaves contact with the substrate on the opposite side of the fiber or reverses direction. The optimal adhesive fiber length will depend upon many factors, as set forth above, but is preferably long enough that the adhesive fibers will break before the portion of the adhesive fiber on either side of the long fiber (the one being attached) can completely peel away from the substrate.

The synthetic attachment disc 2 of the present invention will have a width and a length. See FIG. 2. Taken together, length of the adhesive fibers as discussed above will define the width of the synthetic attachment disc 2. The length of the synthetic attachment disc of the present invention is the distance over which the adhesive fibers 8 cover the long fiber 4. All other things being equal, the amount of adhesion increases with an increase in the length or width of the adhesive disc.

Adhesive fibers 8 may be made using any suitable method known in the art for making nanofibers or microfibers including, without limitation, electrospinning, Nanofibers by Gas Jet (NGJ), melt blowing, Rotary Jet Spinning (RJS), Gas Jet Fibers (GJF) and combinations thereof. As should be apparent, the materials selected for use in making the adhesive fibers 8 should be compatible with the particular method to be used to form the adhesive fibers 8. In embodiments using electrospinning, for example, only materials that can be electrically charged and electrospun (like thermoplastic polyurethane) would be considered when selecting a suitable material. In some embodiments, adhesive fibers 8 may be made by electrospinning a thermoplastic polyurethane. Methods like Nanofibers by Gas Jet (NGF), melt blowing, Rotary Jet Spinning (RJS), Gas Jet Fibers (GJF), however, can be expanded to a wide variety of materials, solvents and melts as electric field and dielectric solutions will not be needed.

Elasticity of the polymer to be formed into adhesive fibers 8 is important for ensuring higher adherence to the substrate. Nanofibers with elastic properties (thermoplastic polyurethane, polyesters, natural silk) will allow stretching of fibers on peeling, leading to higher adhesion. In contrast, stiff materials such as nylon nanofibers will not stretch and lead to a lower pull-off force and poor adhesive performance.

Some suitable materials for use in forming adhesive fibers 8 may include, without limitation, thermoplastic polyurethane, polyesters, natural silk fibroin, synthetic spider silk, polyvinyl alcohol, polymethacrylates, polylactic acid (PLA), collagen-polyethylene oxide blend, silk-polyethylene oxide blend, chitosan, gelatin, polyethylene glycol (PEG), poly(lactide-co-glycolide) (PLGA), polycaprolactone, polyethylene-co-vinyl acetate (PEVA) and combinations thereof. In some embodiments, the adhesive nanofibers are comprised of a thermoplastic polyurethane and the substrate used is aluminum. It has been found that thermoplastic polyurethane has both the toughness and elasticity that are critical in increasing the peel forces. Additionally, thermoplastic polyurethanes are known to be biocompatible and have been used extensively in making tissue scaffolds and other synthetic biomedical structures.

The morphology of the discs prepared shows inclined fibers lying close to each other. See FIGS. 4A-D, 5A-B. The spacing/density of fibers over a length of underlying fiber is important for adhesive performance. Closely spaced fibers provide better adhesion as compared to fibers lying farther apart from each other. A well balanced selection of material, spacing/density and observed morphology is needed to optimize the adhesive performance.

Similarly, where many adhesive fibers are to be used and/or the adhesive fiber density is high, the material used to form the adhesive fibers need not adhere as well to the substrate in order to provide the same overall adhesion force. Conversely, if fewer adhesive fibers are used and/or the adhesive fiber density is low, each of those adhesive fibers must have better adherence to generate the same overall adhesion force.

As should likewise be apparent, the suitability of a particular material for forming the adhesive fibers 8 may also depend upon the particular substrate 6 being used. As used herein, the terms "substrate" and "surface" are used interchangeably and refer to a substantially flat area of an object to which the fiber is to be attached by the synthetic attachment disc of the present invention. While not required to practice the invention, substrate 6 is preferably substantially flat in order to effectively collect the nanofibers over the underlying thread fiber. However, geometries such as spherical and cylindrical may also be possible.

The synthetic attachment discs 2 of the present invention may be used with a wide variety of different substrates, including without limitation, aluminum, brass, copper, zinc, tin, nickel, silver alloys, bone, glass, stainless steel, silicon, plastic, or skin. It has been found that the adhesive fibers 8 of the present invention better adhere to substrates with a higher surface energy than to substrates with a lower surface energy. In some embodiments, substrate 6 may have a surface energy of from about 10 $mJ/m^2$ to about 3000 $mJ/m^2$. In some embodiments, substrate 6 may have a surface energy of from about 50 $mJ/m^2$ to about 2000 $mJ/m^2$. In some embodiments, the substrate may have a surface energy of from about 100 $mJ/m^2$ to about 1000 $mJ/m^2$.

Further, the material or materials selected for adhesive fibers 8 should preferably be carefully matched to the intended substrate to ensure the proper amount of adhesion between the fibers and the substrate. Where, for example, the substrate to be used has a relatively low surface energy, a material with a higher surface energy may be required to generate adhesive fibers with the required adhesion force. Conversely, where the substrate to be used has a relatively high surface energy, a material with a lower surface energy may be used to form adhesive fibers with the required adhesion force.

Figure 3:
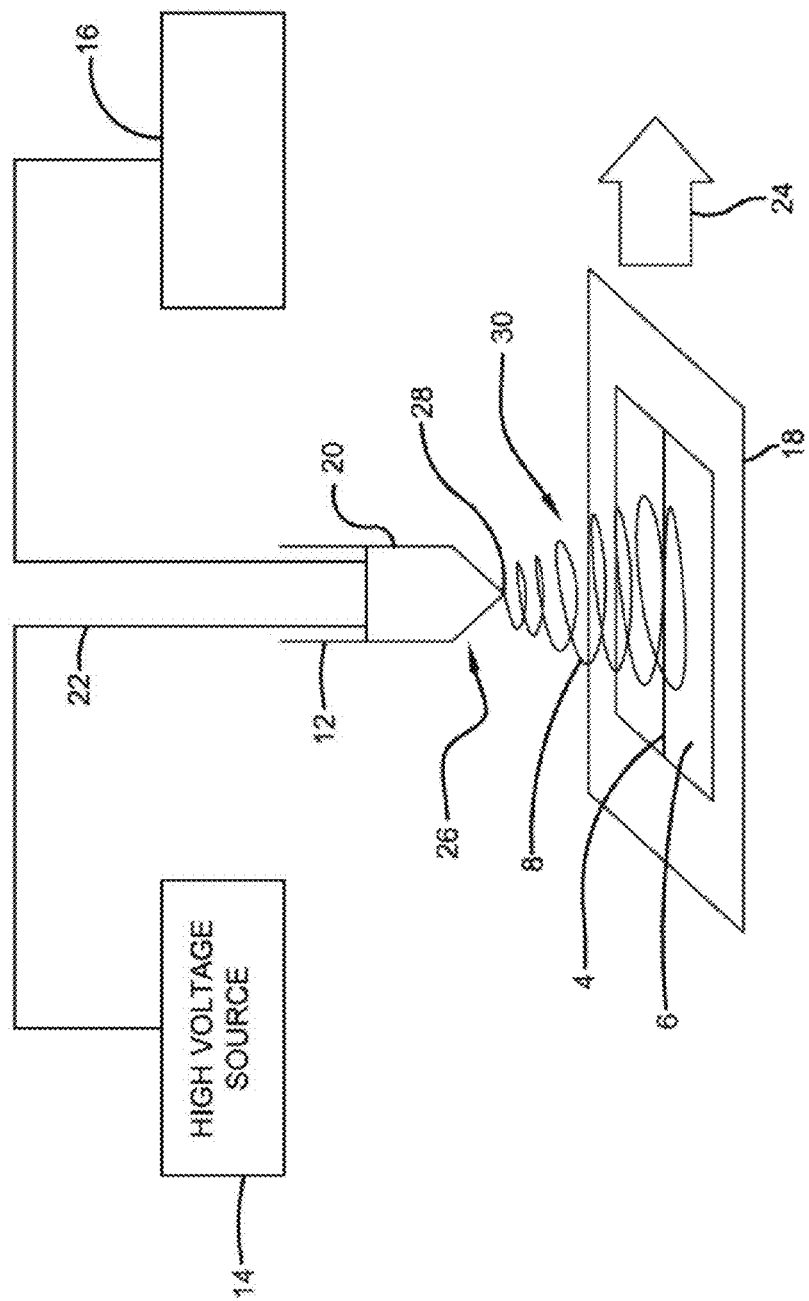
FIG. 3 is an electrospinning set-up used in making synthetic attachment discs of adhesive fibers according to at least one embodiment of the present invention.

As set forth above, in some embodiments adhesive fibers 8 may be formed by electrospinning. Electrospinning is well known in the art and can produce ultrafine fibers with diameters ranging from a few nanometers to ten or more micrometers. An apparatus for electrospinning synthetic adhesive fibers according to at least one embodiment of the present invention is shown in FIG. 3. Various methods for electrospinning synthetic adhesive nanofibers are known in the art and will be discussed herein only to the extent necessary to fully describe the invention. In general outline, electrospinning involves production of continuous fibers by application of an external electric field to a polymer solution. The fibers so produced have a high surface area-to-volume ratio which, as set forth above, helps them adhere more readily to the substrate.

In some embodiments, the electro-spinning set-up shown in FIG. 3 may be used. The electro-spinning set-up of FIG. 3 includes a capillary tube 12, high voltage source 14, air supply 16 and a velocity-controlled moving stage 18. A polymer solution 20 is held in a capillary tube 12 with a copper wire 22 immersed in it and the whole assembly was connected to a high voltage source 14. The substrate 6 is kept on a velocity-controlled stage 18, which also acts as a grounded collector plate, and a long fiber 4 (to be attached) is placed on the substrate 6 and is oriented as to be generally in line with the path of travel 24 of the velocity-controlled stage 18. Collector plate 18 is grounded to create an electrical potential between polymer solution 20 and collector plate 18 and as a voltage is applied by the high voltage source 14, polymer solution 20 is ejected from the tip of the capillary tube 12 to form a jet 28 of polymer solution 20, which elongates into an adhesive fiber 8. The air supply 16 is applied to control the droplet formation and facilitate formation of the jet 28.

It is known that as the jet 28 of polymer solution 20 leaves the tip 26 and begins to solidify into an adhesive fiber 8, its path becomes more and more unstable and will begin to move as a pendulum. See, T. Han, D. H. Reneker, A. L. Yarin, Polymer (2008), 49, 2387-2425, the disclosure of which is hereby incorporated herein by reference in its entirety. By varying the distance between the tip 26 and the collector plate/stage velocity-controlled stage 18, it is possible to spin an adhesive fiber 8 in regular loops 30 of a relatively consistent diameter across the long fiber 4 to be secured to the substrate 6. And as the substrate 6 is moved by the velocity-controlled stage 18, each loop of the spun adhesive fiber 8 falls in a slightly different place over the long fiber 4 and the adjacent substrate 6A, 6B. See FIGS. 3, 4b, 4D. Accordingly, each of these loops 30 will have a segment running from a first side of the substrate 6A, across the long fiber 4, and onto the second side of the substrate 6B and another segment running back across the long fiber 4 from the second side 6B to the first side 6A. Taken together, these loops 30 create an array of segments 10 running across the long fiber 4, attaching it to the substrate 6.

While the velocity-controlled stage 18 described above moves at a constant speed in a linear direction, the invention is not so limited and may include velocity controlled stages that move in other ways to cause the adhesive fibers to form the synthetic attachment disc of the present invention. In some embodiments, the velocity controlled stage may also move from side to side and/or in a circular or orbital pathway.

It has been found that the long fiber 4 need not be oriented exactly parallel with the path of travel of the velocity-controlled stage 18, but is preferably, however, substantially parallel so that the approximately same amount the loops 30 of adhesive fiber 8 fall on either side of the fiber 6A, 6B as the velocity controlled stage 18 moves. As used herein, the term "substantially parallel" means within about 30 degrees of parallel. If the adhesive fiber loops are large enough that the length of the synthetic adhesive fibers on both sides of the fiber is sufficient, the orientation of the fiber may vary from the path of travel of the velocity-controlled stage 18 by as much as 50 degrees.

Figure 4A:
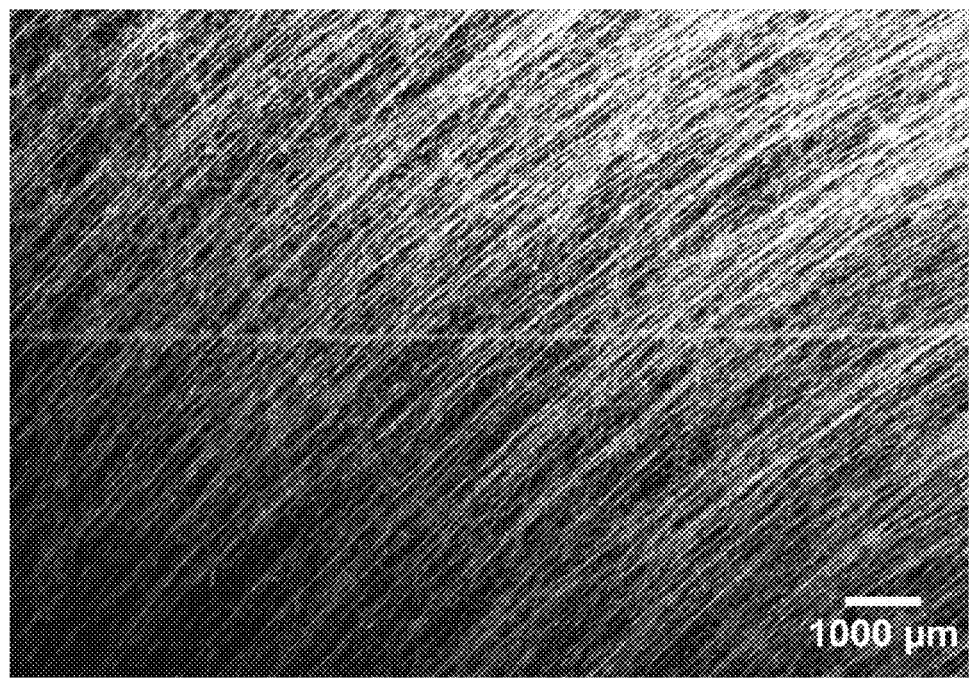
FIGS. 4A-D is a series of images depicting synthetic discs of adhesive nanofibers spun on a nylon thread by varying the velocity of the collector stage, according to at least one embodiment of the present invention.
Figure 4B:
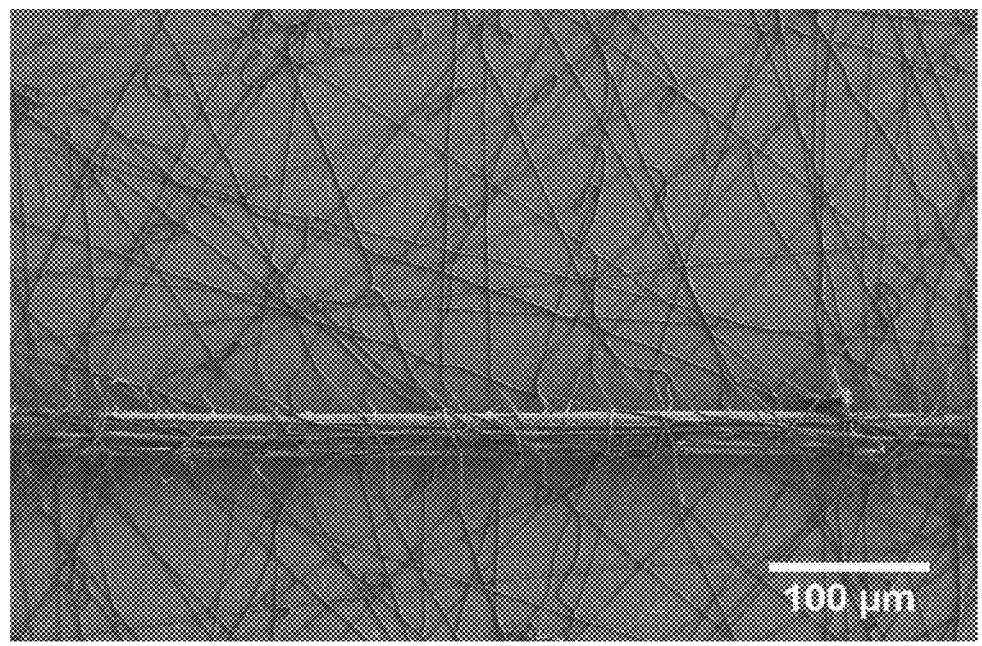
Figure 4C:
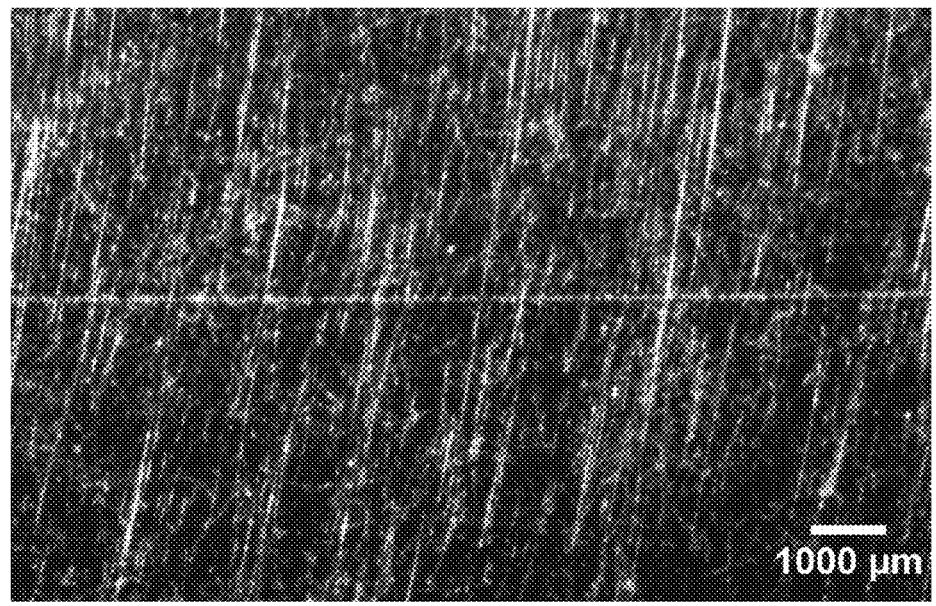
Figure 4D:
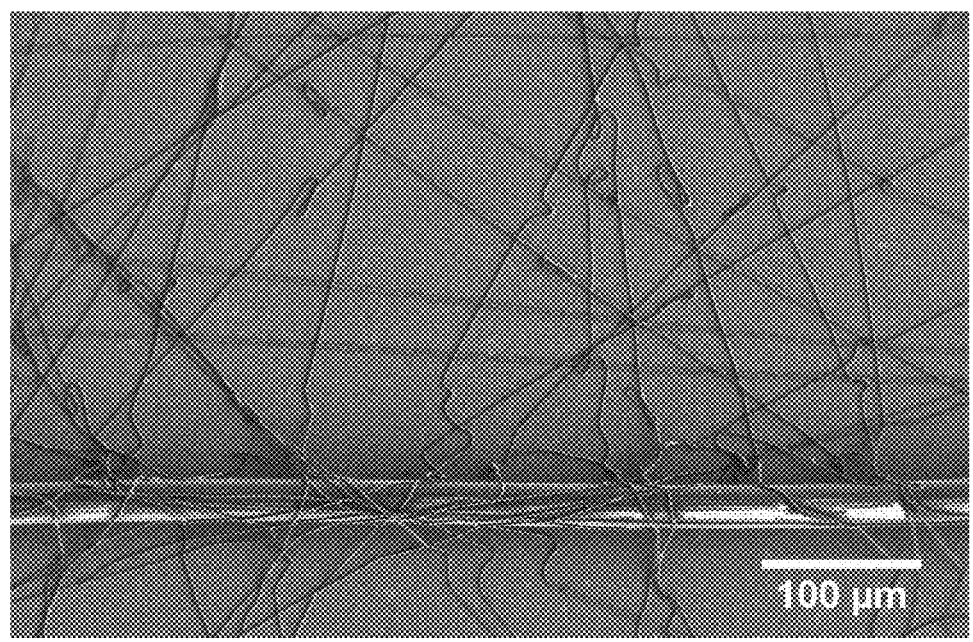
Figure 5A:
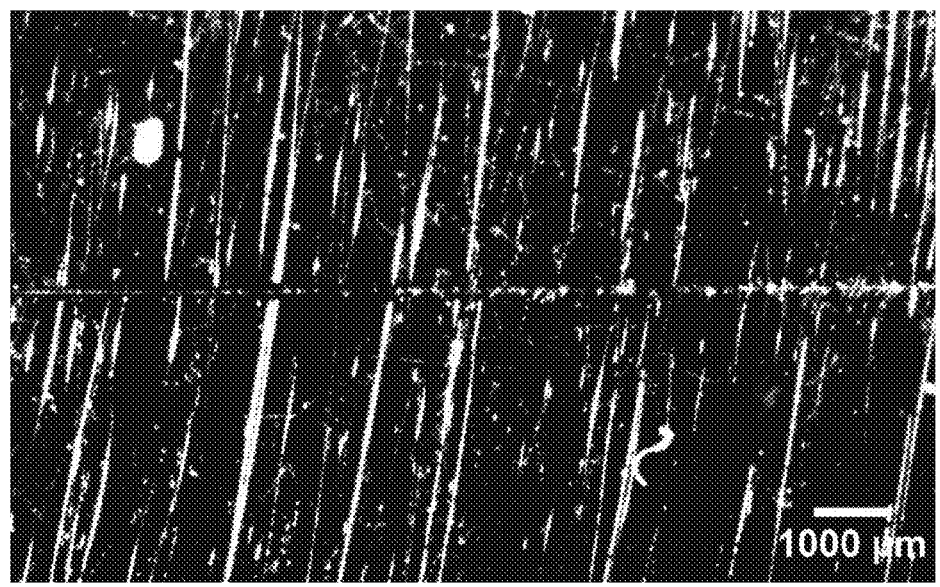
FIGS. 5A and 5B are optical (FIG. 5A) and SEM (FIG. 5B) images of the synthetic attachment discs prepared according to at least one embodiment of the present invention at collector stage velocity 5 cm/s. The scale bars for FIGS. 5A and 5B are 1000 μm and 100 μm, respectively.
Figure 5B:
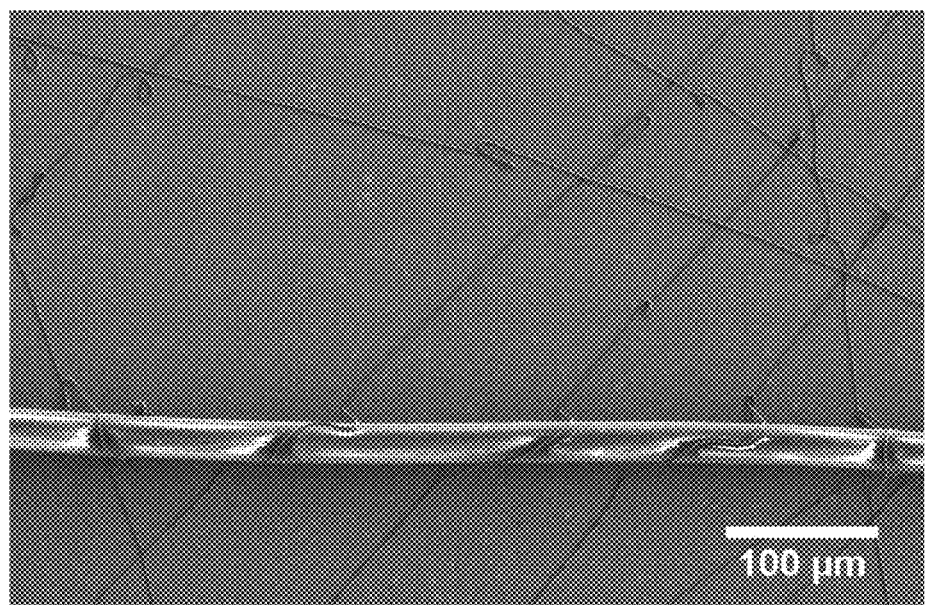

FIGS. 4A, 4C, and 5A show the optical images and FIGS. 4B, 4D, and 5B show SEM micrographs of synthetic attachment discs 2 prepared by varying the speed of the collector plate/velocity-controlled stage 18 (as described more fully in the experimental section). FIGS. 4A-D and 5A-B show electrospun adhesive fibers 8 aligned over an underlying nylon thread on an aluminum substrate. It has been found that by moving the collector plate 18 at different velocities, the spacing of the adhesive fibers 8 can be controlled. That is, the spacing between the adhesive fibers has been found to increase with increase in the velocity of the velocity-controlled stage 18 and decrease with a decrease in the velocity of the velocity-controlled stage 18. For example, the optical and SEM images for synthetic attachment discs prepared by moving the collector plate at speeds of 0.1 cm/s, 1 cm/s and 5 cm/s are shown in FIGS. 4A and 4B, FIGS. 4C and 4D, and FIGS. 5A and 5B, respectively. The spacing between the electrospun adhesive fibers in these examples was measured as 15±8 µm, 32±12 µm and 74±15 µm for speeds 0.1 cm/s, 1 cm/s and 5 cm/s, respectively.

In other embodiments, the synthetic adhesive fibers may be formed by a Nanofibers by Gas Jet (NGJ) process. In these embodiments, nanofibers or microfibers are created by using highly pressurized gas which interacts with the polymer fluid capable of undergoing mechanical deformation in form of cylinder or other variety of long shapes. The placement and movement of the velocity controlled stage at the point where fibers are collected may be controlled to make the adhesive attachment discs with varying spacing.

In other embodiments, the synthetic adhesive fibers may be formed by a melt blowing process. In these embodiments, a polymer melt is extruded from a orifice and the extrudate is subjected to stream of hot air for producing the fibers. The polymer is fed into a hopper and heated in the extruder till it becomes suitable for melt spinning. The orifice tip for the ejection of molten polymer is manipulated at high temperature and high velocity air which forces the melt to convert into fibers. The placement and movement of the velocity controlled stage at the point where fibers are collected may be controlled to make the adhesive attachment discs with varying spacing.

In other embodiments, the synthetic adhesive nanofibers may be formed by a rotary jet spinning process. In these embodiments, a high speed rotating nozzle and a centrifugal force produces a polymer jet which solidifies to form the fibers collected on circular collector surrounding the rotating reservoir. Substrates with the underlying fiber can be attached on to the circular collector with the speed of the rotating reservoir varied to get the adhesive fibers with different spacing.

In other embodiments, the synthetic adhesive nanofibers may be formed by a gas jet fibers (GJF) process. In these embodiments, gas jets are exposed to polymer solutions coming out of nozzles, and convert them into liquid jets and finally to continuous fibers. Initially, the liquid jet is of larger diameter which narrows down to fibers due to fiber stretching and solvent evaporation, on interaction with the gas jet. The resulting fibers produced on interaction with gas jet can be collected over the substrate with the underlying fiber, moving on a velocity controlled stage placed at the collection position.

It should be appreciated that the present invention is not limited to embodiments where the fiber generating apparatus is fixed and substrate is moved to form the synthetic attachment disc, as described above. What is important for the purposes of the present invention is the movement of the of the substrate and the source of the adhesive fibers relative to each other in such a way as to form a synthetic attachment disc over the fiber or other object to be attached to the substrate. In some embodiments, the size, shape, and/or nature of the substrate make it impractical or impossible to move the substrate relative to the fiber forming apparatus. In these embodiments, the synthetic attachment disc 2 over the fiber or other object to be attached to the substrate may be formed by the controlled movement of the output of the fiber generating apparatus relative to the fixed substrate.

The particular method and/or apparatus necessary for moving the output of the fiber forming apparatus relative to the substrate will depend, of course, on the method used to generate the adhesive fibers. One of ordinary skill in the art should be able to arrive at such a method and/or apparatus without undue experimentation.

It has been found from peeling tests done on synthetic attachment discs of at least one embodiment of the present invention that the measurable pull-off forces can be controlled by manipulating parameters such as spacing and elasticity of the adhesive nanofibers as well as modifying the surface energy of the collector substrate. Based on these peeling experiments, a model for correlating the energy expended and the deformation zone widths created during the peeling process has been created.

As will be described in more detail below, the attachment forces were measured on a nano-scale force sensor, Nanobionix (see experimental section) using a 180° peel test geometry (FIG. 6) at three different peel rates (1 mm/s, 0.1 mm/s and 0.01 mm/s) for discs formed by electrospinning at collection plate velocities of 0.1 cm/s, 1 cm/s and 5 cm/s, as described above. See FIGS. 4A-B, 4C-D, and 5A-B. In these examples, the peeling of the nylon thread takes place by breaking the long electrospun polyurethane threads holding the nylon thread on the aluminum substrate. The length of the polyurethane fibers affected during the peeling process is many orders of magnitude larger than the fiber diameter. It is believed that the use of a higher peel angle ensured that the effects of the nylon thread on the peel force measurements were eliminated. FIGS. 7A, 7B, and 7C show the force extension curve for the peel rates 1 mm/s, 0.1 mm/s and 0.01 mm/s, respectively. As evident from the force extension curves, the peel lengths for various rates are different, the extension for 0.01 mm/s being the minimum due to limitation of experimental time.

Figure 7A:
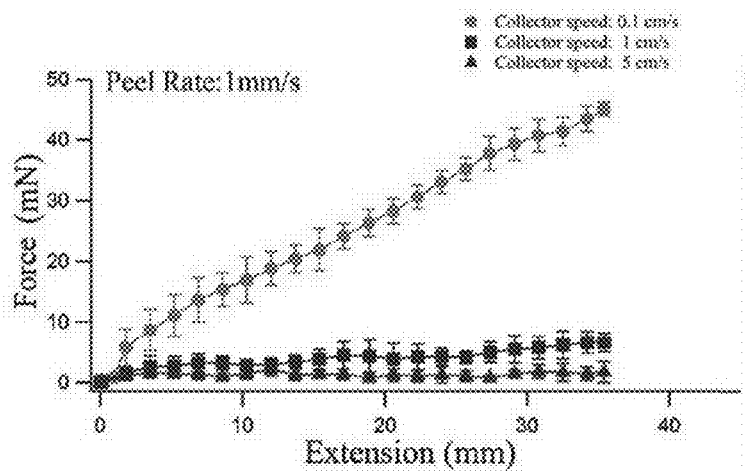
FIGS. 7A, 7B, and 7C are graphs showing the peel force behavior at peel rates 1 mm/s (FIG. 7A), 0.1 mm/s (FIG. 7B), and 0.01 mm/s (FIG. 7C), respectively for synthetic discs of adhesive nanofibers according to at least one embodiment of the present invention. The closed circles, squares, and triangles show the peel forces shown by synthetic attachment discs made at stage velocities 0.1 cm/s, 1 cm/s and 5 cm/s cm respectively.
Figure 7B:
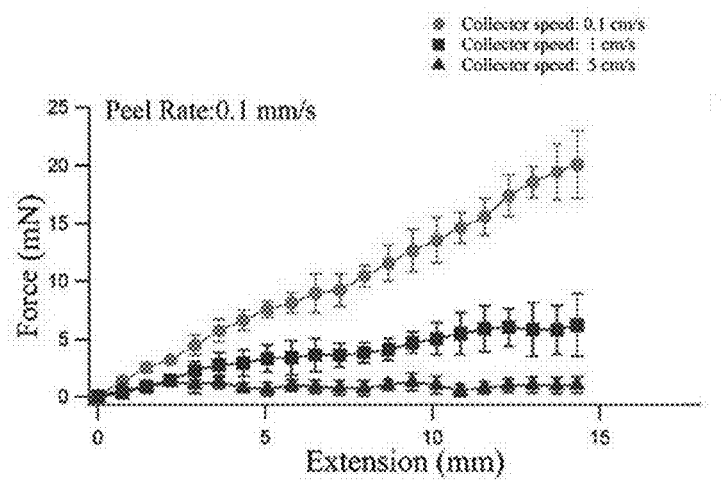
Figure 7C:
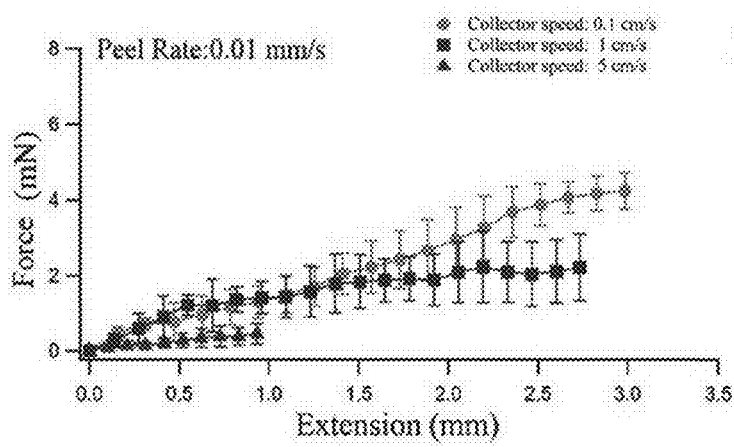
Figure 8A:
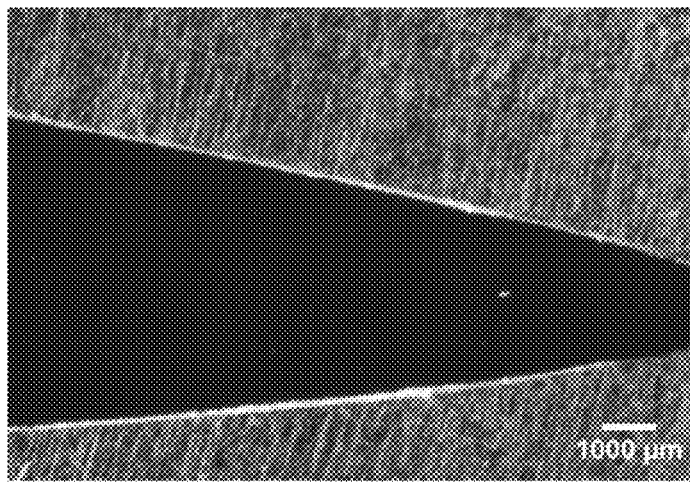
FIGS. 8A-C is a series of images showing the deformation zones formed at a peeling rate 1 mm/s for synthetic discs of adhesive nanofibers made at collector stage velocities 0.1 cm/s (FIG. 8A), 1 cm/s (FIG. 8B), and 5 cm/s cm (FIG. 8C), according to at least one embodiment of the present invention. A variation in the peeling zone can be seen with respect to the spacing of the fibers. The scale bar for FIGS. 8A-C is 1000 μm.
Figure 8B:
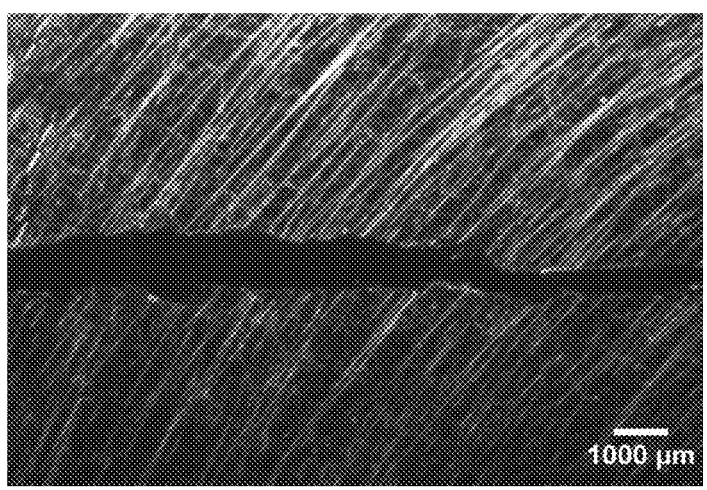
Figure 8C:
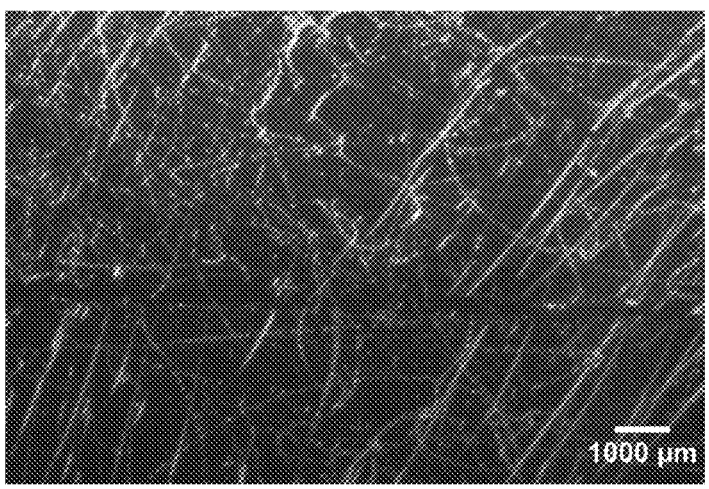
Figure 9A:
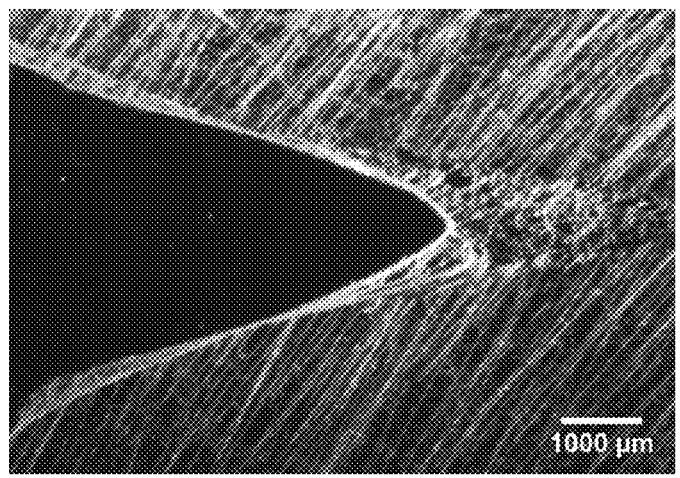
FIGS. 9A-C is a series of images showing the deformation zones formed at a peeling rate 0.1 mm/s for synthetic discs of adhesive nanofibers made at collector stage velocities 0.1 cm/s (FIG. 9A), 1 cm/s (FIG. 9B), and 5 cm/s cm (FIG. 9C), according to at least one embodiment of the present invention. A variation in the peeling zone can be seen with respect to the spacing of the fibers. The scale bar for FIGS. 9A-C is 1000 μm.
Figure 9B:
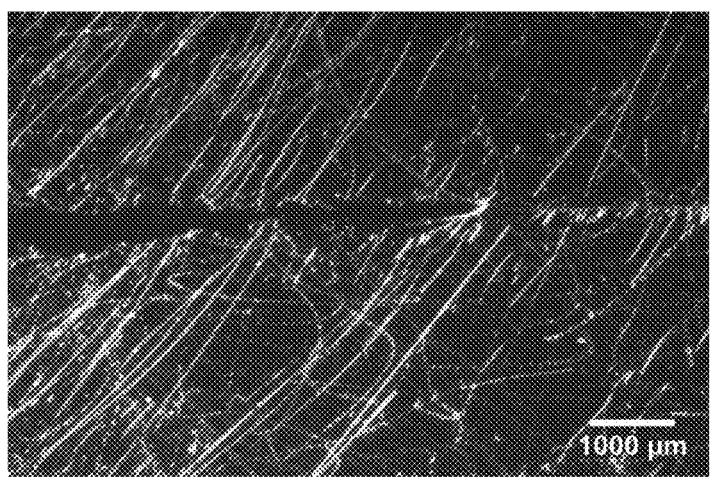
Figure 9C:
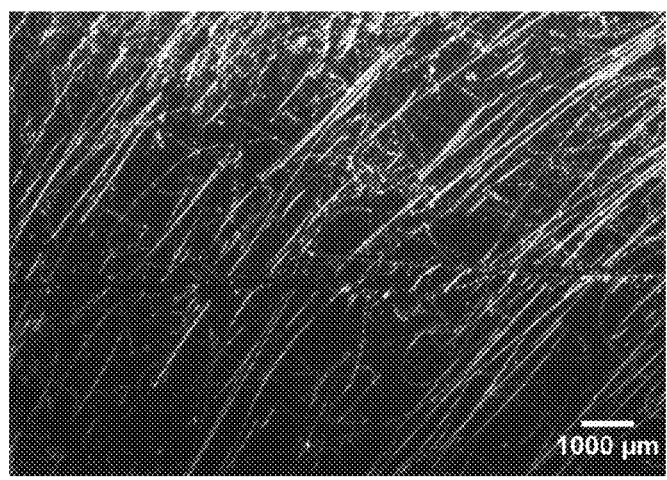
Figure 10A:
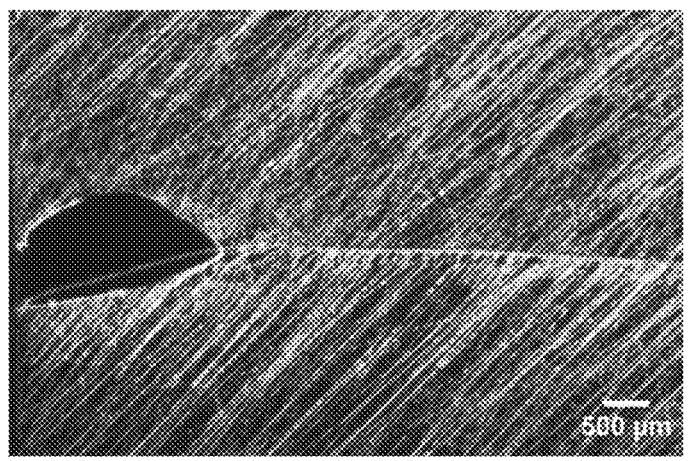
FIGS. 10A-C is a series of images showing the deformation zone observed in synthetic attachment discs prepared according to at least one embodiment of the present invention using collector stage velocities of 0.1 cm/s (FIG. 10A), 1 cm/s (FIG. 10B), and 5 cm/s (FIG. 10C) respectively, that have been peeled at a rate of 0.01 mm/s. The scale bar for FIGS. 10A-C is 500 μm.
Figure 10B:
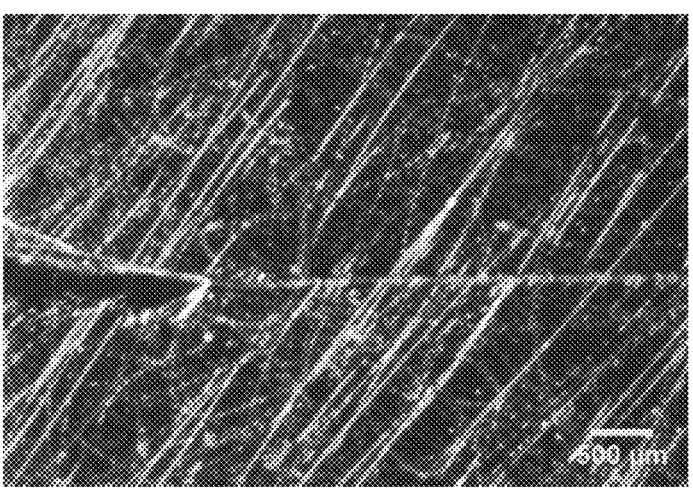
Figure 10C:
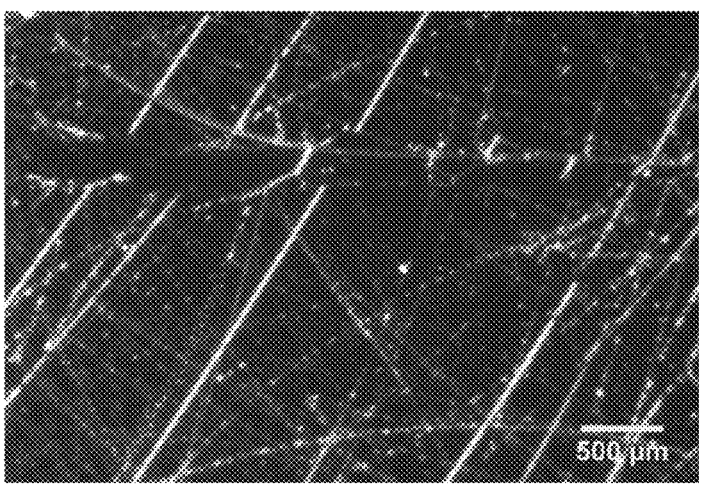
Figure 11A:
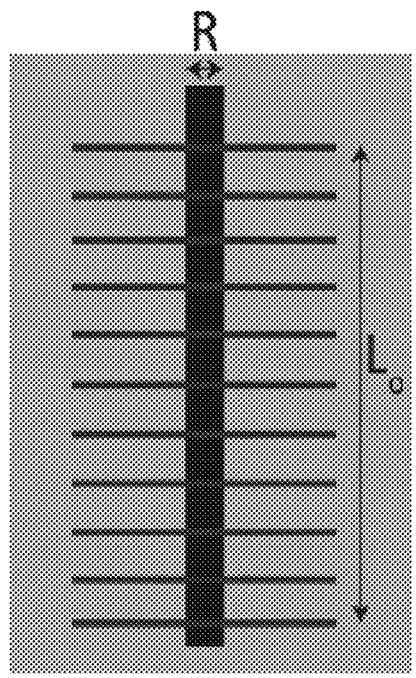
Figure 11B:
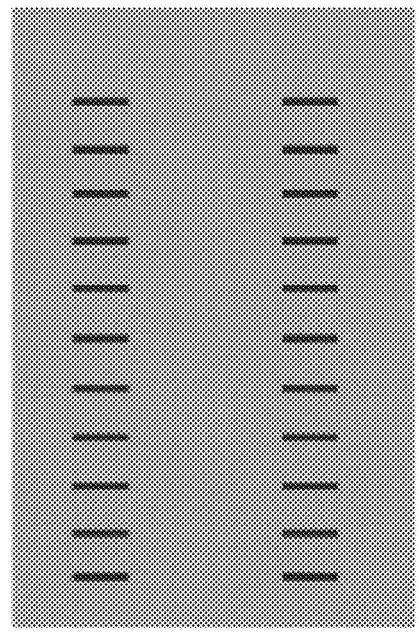
Figure 11C:
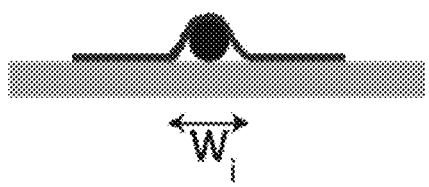
FIG. 11C and FIG. 11D show the front view.
Figure 11D:
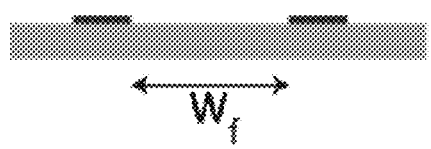

As set forth above, it has been found that the peeling behaviors of the synthetic attachment discs of the present invention depend, at least in part, on the spacing between the synthetic adhesive nanofibers. Adhesive discs prepared at a collector speed of 0.1 cm/s show a region of built-up force and the absence of a steady state region, in all the three peel rates as seen in FIGS. 7A, 7B, and 7C (solid green circles). It is thought that the stretching of the closely packed nanofibers as well as inadequate substrate length may be the reasons for the absence of the peeling plateau in these discs. The peeling of these discs, having fibers lying very close to each other, showed a characteristic V shaped peel zone (FIGS. 8A, 9A, and 10A). The force-extension curves for the other two examples (prepared at collector speeds 1 cm/s and 5 cm/s) are set forth in FIGS. 7A, 7B, and 7C (solid squares and solid triangles) and show an initial build-up of the force until a critical value is reached, where the crack zone then propagates with an average velocity of the peel rate, leading to the emergence of the peeling plateau. Thus, it is evident from the peeling behaviors that the spacing of the polyurethane fibers affects the shape of the peeling zone and also the nature of the force extension curve.

As used herein with respect to these peeling tests, the term "adhesion force" may be defined as the maximum force value reached before the plateau is attained. However, in the cases where there is no steady state region, the maximum force achieved is considered to be the adhesion force. As expected, adhesion forces increased with a decrease in the spacing between of synthetic adhesive nanofibers (an increase in nanofiber density) for each peel rate. Further, it is believed that in most cases, the observed variation in the steady peeling force in these examples was due to heterogeneity of the spacing of the electrospun patterns over the length of the sample (range of cm). The effects of the spacing and the peel rate on the peel zone are, nevertheless, clearly evident from the optical images of the discs shown in FIGS. 8A-C, 9A-C, and 10A-C for peel rates 1 mm/s, 0.1 mm/s and 0.01 mm/s, respectively.

The advantages of synthetic attachment discs of the present invention are further evident using a model based on conservation of energy. The total work done in peeling ($U_T$) is the work expended in peeling all the electrospun fibers ($U_P$) and in the stretching (until failure) of these electrospun fibers ($U_S$). These terms can be described by the following:

$$U_T = U_P + U_S \quad \text{Equation (1)}$$

$$U_S = \omega_0^1(\sigma\delta\in)*\pi*r^2*l*n \quad \text{Equation (2)}$$

Here, $\sigma$ and $\delta\in$ are the stress and change in strain values determined from tensile stretching of a single adhesive nanofiber, r is the radius of the adhesive nanofiber, l is the length of adhesive nanofiber affected during the peeling experiment (assumed equal to the width of the fracture zone wf, as shown in FIGS. 11A-D), and n is the number of adhesive nanofibers stretched, peeled and broken (calculated by dividing the total length of the discs, $L_o$, by the spacing between the nanofibers, shown in FIGS. 11A-D).

Figure 12A:
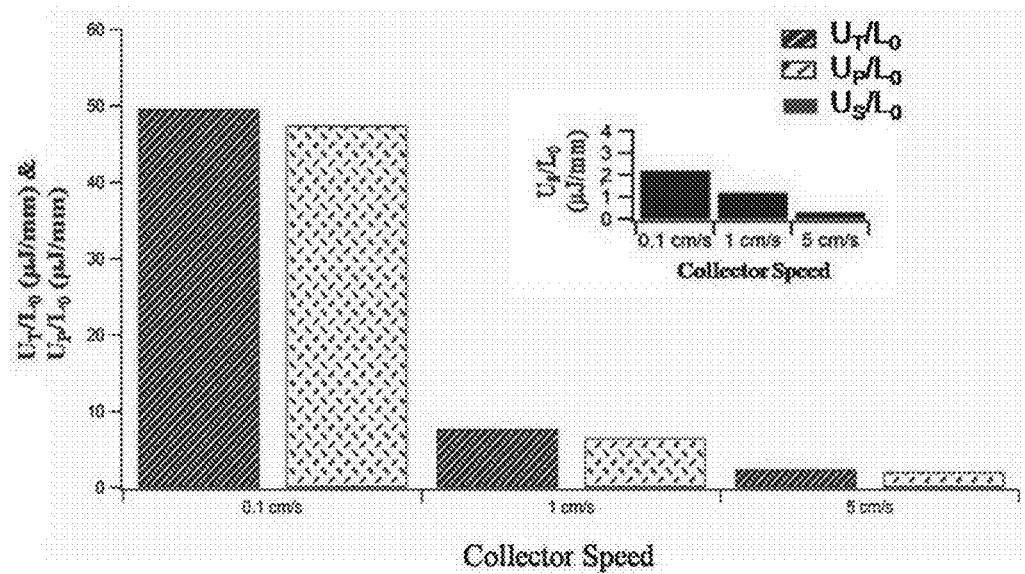
FIGS. 12A and 12B are graphs showing the total energy expended ($U_T$) and energy expended in peeling ($U_P$) values for different spinning conditions (collector stage velocities of 0.1 cm/s, 1 cm/s, and 5 cm/s cm) for peeling rates 1 mm/s (FIG. 12A) and 0.1 mm/s (FIG. 12B), respectively for synthetic discs of adhesive nanofibers made according to at least one embodiment of the present invention. The inset in each figure shows the $U_s$ contribution for synthetic discs of adhesive fibers made at collector stage velocities of 0.1 cm/s, 1 cm/s, and 5 cm/s cm.
Figure 12B:
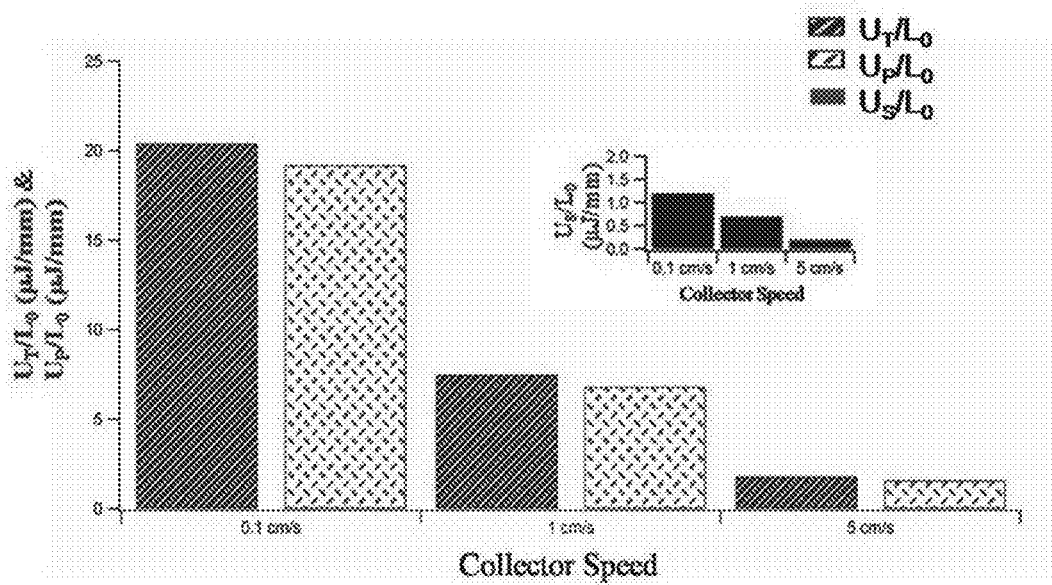

Using Equation 2 for a peeling rate of 1 mm/s and a stage speed 0.1 cm/s, for example, the strain energy contribution can be determined to be, $U_S$=38.8 µJ. The total work expended in peeling the disc can be determined by calculating the area of the force-distance measurement curve shown in FIG. 7B ($U_T$=893 µJ). The difference in $U_T-U_S$=854.2 µJ is the adhesion energy, $U_P$. The term Up/Us may also calculated in order to estimate the importance of the peeling and stretching terms for synthetic discs prepared. To account for the different peeling lengths $L_o$ the contribution of the energy terms were compared between discs of different spacings peeled at the same rate. Additionally, to compare the trends, the energy values were normalized with respect to the $L_O$, as shown in FIGS. 12A-B and in Table 1 below.

Since there is a variation in the lengths peeled for 0.01 mm/s within different spacings due to experimental limitations in the example, the values for this peeling speed could not be compared. For peel rates of 1 mm/s and 0.1 mm/s, however, the energy contribution terms normalized by $L_0$ increase as the spacing between the fibers reduces. As the total energy expended in peeling ($U_T/L_0$) is proportional to the adhesion force recorded, the maximum energy expended was for the discs prepared at slowest collector speed (0.1 cm/s), while the adhesion energy contribution ($U_P$) dominated over the strain energy contribution ($U_S$) in all the discs studied.

Further, the intrinsic adhesion energy between the synthetic adhesive nanofibers and the substrate should also be considered and, to the extent possible, optimized. Where there is a low intrinsic adhesion energy between the adhesive nanofibers and the substrate, it is important to have higher disc width (i.e. greater adhesive nanofiber length), otherwise the load sharing between multiple nanofibers will be reduced and the individual nanofibers may be completely peeled off and the fracture width will be equal to the width of the disc. It has likewise been found that the higher the fracture width, the more energy is required to peel the adhesive nanofibers from the substrate. Further, the amount of elastic energy required to stretch the nanofibers during peeling has also been found to increase. On the other hand, if the intrinsic adhesion energy between the adhesive nanofibers and the substrate is too high, then the adhesive nanofibers will be subjected to a large strain very quickly and may break, making this a very weak joint. One of ordinary skill in the art should be able to select materials and adhesive nanofiber spacing to optimize the adhesive forces between the adhesive nanofiber and the substrate without undue experimentation.

Figure 13A:
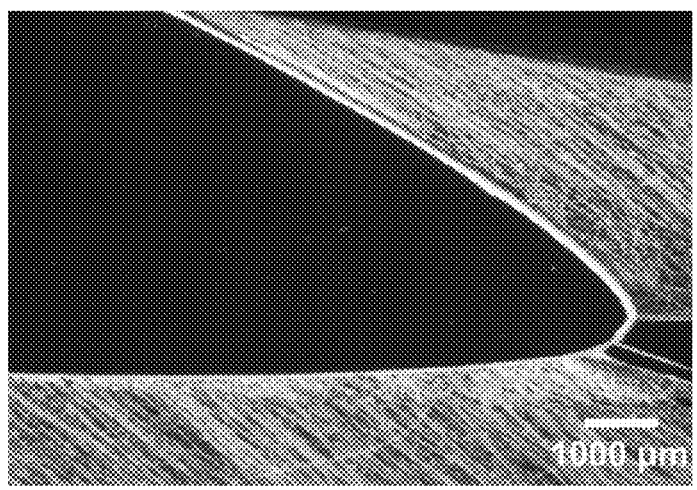
FIGS. 13A-C is a series of images showing the deformation zone created during peel tests of synthetic discs of adhesive nanofibers made according to at least one embodiment of the present invention on substrates with different surface energies.
Figure 13B:
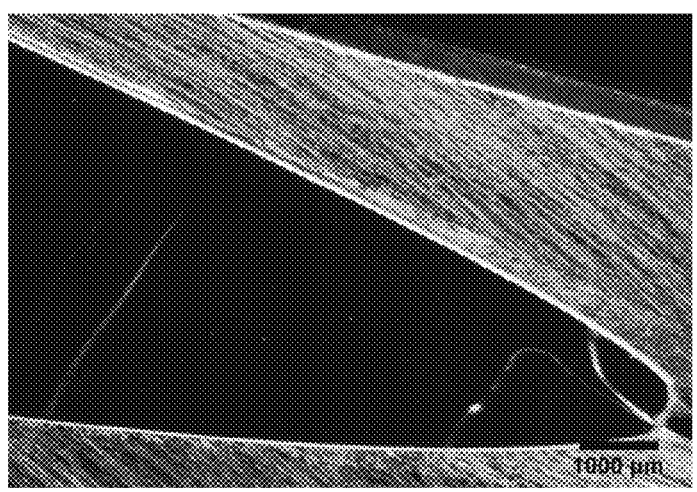
Figure 13C:
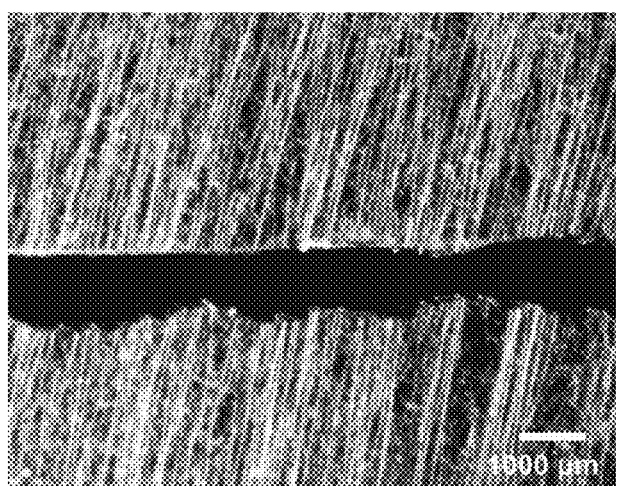
Figure 14:
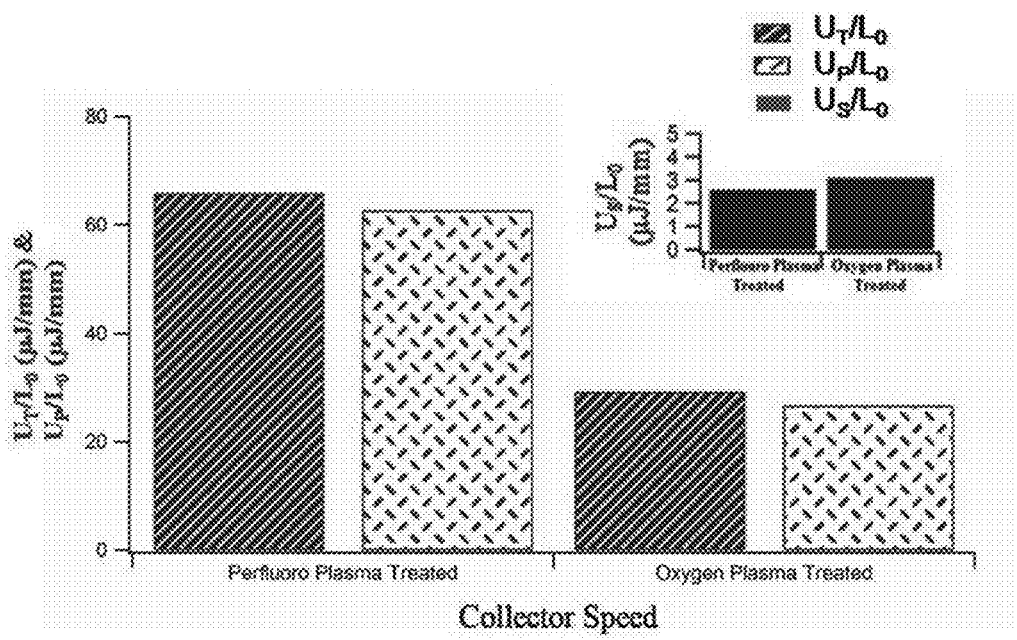
FIG. 14 is a graph showing the energy contributions $U_T$ and $U_P$ for synthetic discs of adhesive fibers formed according to at least one embodiment of the present invention on perfluoro plasma and oxygen plasma treated substrates, peeled at 1 mm/s and prepared at 0.1 cm/s collector stage velocity. The inset in each figure shows the $U_s$ contribution for the perfluoro plasma and oxygen plasma treated substrates.

Similarly, it has also been found that the surface energy of the substrate affects both the peel force and the shape of the deformation zone. To test this, the surface energy of the aluminum substrate was modified by plasma polymerization and oxygen plasma treatment and their peel off behavior compared with the untreated substrates. The adhesive nanofibers were electrospun on the three different substrates, using the collector stage velocity of 0.1 cm/s with parameters such as spacing and diameter (see Table 2, below)

being consistent in the three cases to justify the comparison of peel force. The deformation zones seen after peeling at 1 mm/s from perfluoro plasma treated, untreated and oxygen plasma treated substrates are shown in FIGS. 13A-C, respectively, while the results for the peel force testing are shown in FIG. 14. As seen from the force extension curve (FIGS. 7A-C) and the peeling behavior on different substrates (FIG. 15), a larger deformation zone is associated with higher adhesion force, as predicted by the energy model described previously. The deformation widths for the three substrates are reported in Table 2, below.

Figure 16A:
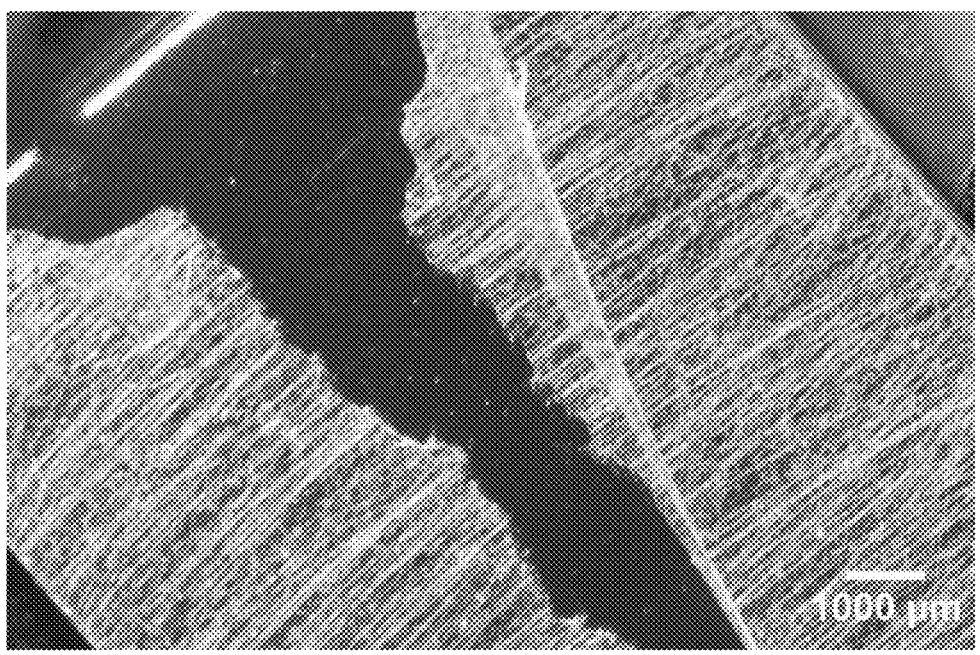
FIG. 16A-B are images showing the peeling behavior of synthetic attachment discs according to at least one embodiment of the present invention prepared on oxygen plasma treated substrates.
Figure 16B:
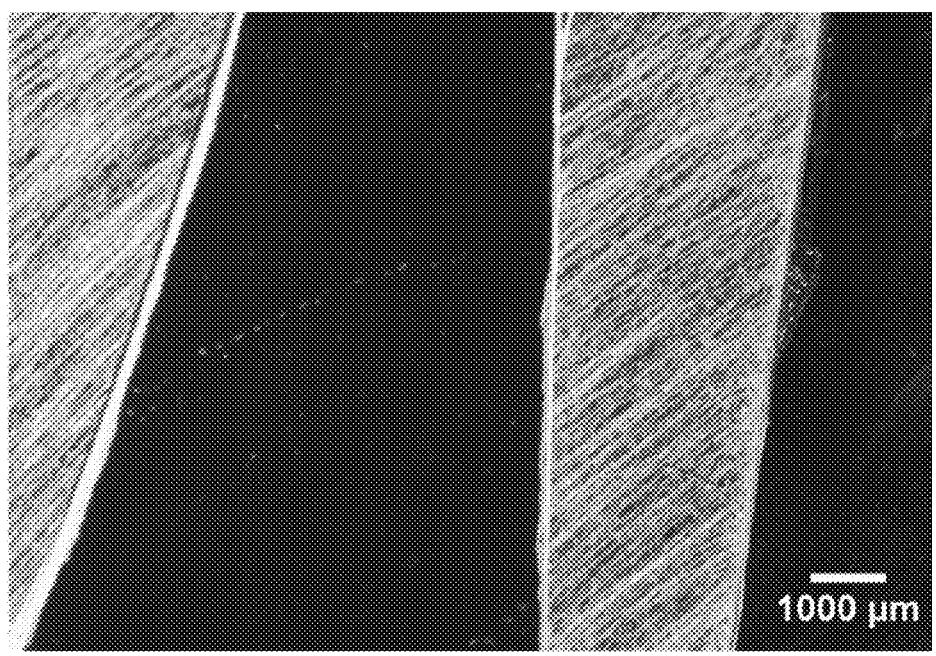

The higher adhesion force and larger deformation zone (V-shaped) for perfluoro plasma treated substrate demonstrates that the polyurethane fibers stretched more as they were peeled from the low energy substrate. See, FIGS. 13A-B. In contrast, peeling from the high surface energy substrate (oxygen plasma treated) showed a narrower deformation zone (accompanied by sharp edges and corners due to breakage of the polyurethane fibers) and a lower adhesion force. See, FIG. 13C. Additionally, in the case of oxygen plasma treated substrates two other types of peel zone formation (see FIG. 16) were occasionally seen. One of these started as a V-shaped zone forming and narrowed down as it was peeled further, while the other resembled the behavior seen in untreated samples. This infrequent behavior can be due to the variation in the oxygen plasma treatment. The untreated aluminum samples show a similar trend in peeling behavior as perfluoro plasma treated substrates. The contributions of the energy terms for the different surfaces have been depicted in FIG. 14 and Table 2. The perfluoro plasma treated substrates showed higher overall energy values due to higher adhesion forces generated while peeling the fibers. In contrast, the oxygen plasma treated surfaces showed lower adhesion forces due to firmly stuck fibers on the treated substrate.

The correct balance between the toughness, flexibility, and the adhesion of the synthetic adhesive nanofibers is necessary to achieve high peeling (adhesive) forces for synthetic attachment discs of the present invention. If the adhesion of the adhesive nanofibers fibers is very strong, it is difficult to peel the fibers and this leads to less energy being expended in stretching the fibers (Us) and a weaker adhesion forces. On the other hand, if the fibers are not tough (high elongation and force at break) then they will break without expending much energy, again resulting in weaker adhesion forces. The optimum design of the adhesive nanofibers of the synthetic attachment disc is necessary to fully exploit this basic design principle to create strong attachment discs.

To further illustrate the importance of the material properties of the electrospun fibers, adhesive discs were electrospun as set forth above from relatively brittle (tip-to-collector distance of 0.5 cm) Nylon 6 threads instead of the polyurethane elastomers nanofibers discussed above (see FIGS. 17A-C). The low toughness and flexibility of the electrospun nylon 6 fibers (1-2 orders of magnitude lower than polyurethane electrospun fibers) resulted in very small energy dissipation during the peeling process, emphasizing that the role of the material is also critical in optimizing the adhesion forces.

An important advantage of the present invention is that they can be produced using a very small amount of material yet provide to a strong pull-off force. It is believed that this technology can be a source of design for both consumer and biomedical industry as it provides a new, strong and versatile way to hold objects together using very little material. Attachment of tendon fibers, ligament fibers, wound openings in the biomedical area while simple attachment methods in daily needs such as paper, threads, plastic among others to variety of substrates are the potential applications.

Moreover, while the present invention has been described in terms attachment of fibers to a surface, it should be appreciated that the synthetic attachment discs of the present invention may also be used join and/or hold objects together. In some embodiments, the synthetic attachment discs may be used to close a wound. In some embodiments, the synthetic attachment discs may be used to close a container.

In light of the foregoing, it should be appreciated that the present invention significantly advances the art by providing a synthetic attachment disc (and related methods) that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Preparation of Polyurethane Solution and Aluminum Substrate

The electrospun polyurethane-based synthetic attachment discs were made from 10 wt. % solution of Tecophillic® polyurethane (Melt Index=18, Lubrizol) prepared in a 4:1 mixture Submitted to 10 of ethanol and tetrahydrofuran (Sigma-Aldrich). The polymer was heated with the solvent mixture in a glass vial for 24 hours in an oven. After the polymer dissolved, the solution was stirred at 60° C. for 2 hours, to obtain a transparent solution. To mimic the staple pin design of natural pyriform discs a 30 µm diameter nylon fiber (Goodyear) was used as the underlying fiber that is held by the electrospun threads. Pre-cleaned aluminum plates (McMaster Carr, 2.5 cm×1 cm in area) were used as the substrate, upon which the nylon thread was laid for making synthetic discs by electrospinning. For the modification of the surface energy of the aluminum substrates, the substrates were plasma treated in an inductively coupled, cylindrical vacuum chamber. One of the precursors chosen was 1H,1H,2H-perfluoro-1-dodecene ($C_{10}F_{21}$—CH=$CH_2$) (97% pure, purchased from Matrix Scientific) to get a low surface energy while oxygen plasma treatment was carried out for two minutes to get substrates with high surface energy properties.

Electrospinning Setup

The electro-spinning set-up (see FIG. 3) mainly involves a capillary tube, high voltage source, air supply and a velocity-controlled moving stage. The polymer solution was held in a 1 mm diameter capillary tube with a copper wire was immersed in it and the whole assembly was connected to a high voltage source. The substrate was kept on a velocity-controlled stage (range of speed from 0.1 cm/s to 5 cm/s), which also acted as a collector. This collector plate was grounded to create the potential difference between the tip and collector. The air supply was applied to control the droplet formation and facilitate the jet formation. For polyurethane electrospinning, a 10 kV voltage was applied to the tip. The distance between the collector and the tip was kept constant at 15 cm, in order to get fibers with uniform dimensions. The fibers from Nylon 6 were produced in a pendulum like pattern with varying spacing (See FIG. 17). For both the materials (polyurethane and nylon 6), a metal substrate (aluminum) lined with underlying nylon thread (30 μm diameter), placed on the velocity-controlled stage was used.

FIGS. 4A, 4C, and 5A show the optical images and FIGS. 4B, 4D, and 5B show SEM micrographs of synthetic discs prepared by varying the speed of the collector plate. The synthetic discs have adhesive fibers aligned over the underlying nylon thread on an aluminum substrate. Thermoplastic polyurethane was selected for the electrospun fibers because toughness and elasticity was critical in increasing the peel forces. Additionally, thermoplastic polyurethane is biocompatible and has been used extensively in making tissue scaffolds and other synthetic biomedical structures. The optical and SEM images for the synthetic discs prepared by moving the collector plate at speeds of 0.1 cm/s, 1 cm/s and 5 cm/s are shown in FIGS. 4A and 4B, FIGS. 4C and 4D, and FIGS. 5A and 5B, respectively. The spacing between the electrospun fibers was measured as 15±8 μm, 32±12 μm and 74±15 μm for speeds 0.1 cm/s, 1 cm/s and 5 cm/s, respectively. The simple strategy of moving the collector plate at different velocities provides an easy control to vary the spacing of the fibers (the spacing between the fibers was seen to increase with increase in the collector speed). The diameters measured from the SEM micrographs, were comparable for all three speeds (1.3±0.1 μm for 0.1 cm/s, 1.5±0.3 μm for 1 cm/s, and 1.9±0.4 μm for 5 cm/s). It was noticed that the underlying nylon fiber and the electrospun polyurethane threads were not necessarily perpendicular to each other.

Example 2

Adhesion Testing

Figure 6:
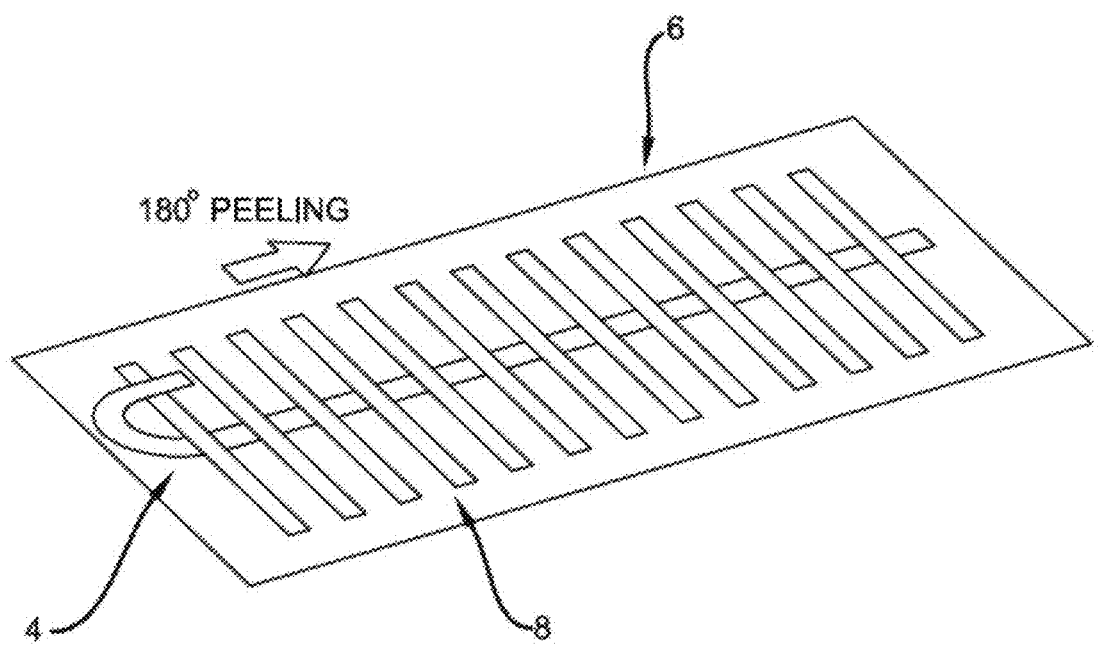
FIG. 6 is a diagram depicting 180° peel adhesion test geometry and measurement. The two ends of the substrate are clamped on the nano-force sensor (Nanobionix) instrument while the loose end of the nylon fiber is pulled at a fixed rate in a direction parallel to the substrate to measure the force.

The attachment forces of the synthetic discs produced above were measured on a nano-scale force sensor (Nanobionix, Agilent Tech.), using a 180° peel test geometry as shown in FIG. 6. The substrate was held in the lower clamp while the free end of the nylon fiber was clamped to the upper clamp. The peeling rate was controlled (1 mm/s, 0.1 mm/s and 0.01 mm/s) and the force versus load-extension was measured and recorded. The 180° peeling geometry was used to eliminate the influence of the modulus of the nylon fibers on the peeling force measurements. The static contact angle measurements were done using Rame-Hart Instruments Advanced Goniometer 500 F1 with Drop Image Advanced software. The contact angle was measured with an 8-10 μL droplet of deionized water.

The discs were tested at three different peel rates (1 mm/s, 0.1 mm/s and 0.01 mm/s) for all three spacings shown in FIGS. 4A-D and 5A-B. The use of a higher peel angle ensured that the effects of the nylon thread on the peel force measurements were eliminated. FIGS. 7A, 7B, and 7C show the force extension curve for the peel rates 1 mm/s, 0.1 mm/s and 0.01 mm/s, respectively. As evident from the force extension curves, the peel lengths for the various rates are different, the extension for 0.01 mm/s being the minimum due to limitation of experimental time. Additionally, being a 180° peeling geometry, the actual peel length is half the extension plotted in the force extension curves, for all the peel rates.

Discs prepared at a collector speed of 0.1 cm/s show a region of built-up force and the absence of a steady state region, in all the three peel rates as seen in FIGS. 7A, 7B, and 7C (solid green circles). The stretching of the closely packed polyurethane fibers as well as inadequate substrate length can be the reasons for the absence of the peeling plateau in these discs. The peeling of these discs, having fibers lying very close to each other, showed a characteristic V shaped peel zone FIGS. 8A, 9A, and 10A. For the other two spacings (prepared at collector speeds 1 cm/s and 5 cm/s), the force-extension curves (solid grey squares and solid pink triangles) shows an initial build-up of the force until it reaches a value where the crack zone propagates with an average velocity of the peel rate, leading to the emergence of the peeling plateau. See FIGS. 7A, 7B, and 7C. The peeling zone in these discs (FIGS. 8B, 9B, and 10B for 1 cm/s) and FIGS. 8C, 9C, and 10C for 5 cm/s) is narrower with sharp nooks and edges unlike the discs prepared at collector speed of 0.1 cm/s, which show a V-shape zone. Also, comparing the discs prepared at 1 cm/s and 5 cm/s, the peeling zone is wider in the discs prepared at 1 cm/s, owing to difference in spacing between them. Thus, it is evident from the peeling behaviors that the spacing of the polyurethane fibers affects the shape of the peeling zone and also the nature of the force extension curve.

The measured values of adhesion forces listed in increasing order of fiber spacing are 45±1 mN, 4±2 mN and 2±0.5 mN for discs peeled at 1 mm/s; 20±3 mN, 5±1.3 mN and 0.7±0.4 mN for discs peeled at 0.1 mm/s and 4±0.4 mN, 1.8±0.7 mN and 0.3±0.1 mN for discs peeled at 0.01 mm/s (see Table 1). A summary of the parameters related to spacing, peeling forces, fracture width and energy values for synthetic discs made on aluminum is provided in Table 1, below. As expected, adhesion forces increased with the increase in density of electrospun fibers in each peel rate. In most cases, the observed variation in the steady peeling force was due to heterogeneity of the spacing of the electrospun patterns over the length of the sample (range of cm). Synthetic discs made at a collector stage velocity of 5 cm/s showed the maximum deviation from the mean adhesion force due to the stick slip behavior observed while peeling.

TABLE 1

|  | Peeling rate | Stage speed | | |
| --- | --- | --- | --- | --- |
|  |  | 0.1 cm/s | 1 cm/s | 5 cm/s |
| Spacing (μm) |  | 15 ± 8 | 32 ± 12 | 74 ± 15 |
| Force (mN) | 1 mm/s | 45 ± 1 | 4 ± 2 | 2 ± 0.5 |
|  | 0.1 mm/s | 20 ± 3 | 5 ± 1.3 | 0.7 ± 0.4 |
|  | 0.01 mm/s | 4 ± 0.4 | 1.8 ± 0.7 | 0.3 ± 0.1 |
| Fracture width (μm) | 1 mm/s | 3407 ± 274 Max: 6760 ± 545 Min: | 900 ± 125 | 420 ± 92 |

TABLE 1-continued

| Peeling rate | Stage speed | | |
|---|---|---|---|
| | 0.1 cm/s | 1 cm/s | 5 cm/s |
| 0.1 mm/s | 54 ± 2<br>2332 ± 90 Max:<br>4596 ± 178 Min:<br>68 ± 2 | 525 ± 110 | 222 ± 35 |
| 0.01 mm/s | 437 ± 40 Max:<br>821 ± 79 Min: 53 ± 1 | 330 ± 42 | 156 ± 49 |

The effects of the spacing and the peel rate on the peel zone were clearly evident from the optical images of the discs shown in FIGS. 8A-C, FIGS. 9A-C, and FIGS. 10A-C for peel rates 1 mm/s, 0.1 mm/s and 0.01 mm/s, respectively. The peeling of the nylon thread takes place by breaking the long electrospun polyurethane threads holding the nylon thread on the aluminum substrate. The average width of the deformation zone in the increasing order of spacing, for the peel rate 1 mm/s, was measured as 3407±274 µm, 900±125 µm and 420±92 µm, for peel rate 0.1 mm/s, 2332±90 µm, 525±110 µm and 222±35 µm and for 0.01 mm/s the measured distances were 437±40 µm, 330±42 µm and 156±49 µm. (Since the discs prepared at lowest collector velocity formed a V shaped zone on peeling, the widths in those cases were calculated by taking the average of the maximum and minimum widths at the two ends of the tapered zone) Table 1 summarizes all the measured widths for different cases. While the zone widths for various peeling rates are not comparable since the discs were peeled at different lengths, it is, nevertheless evident from the images that within the same peeling rate, the peel zone widths increase as spacing between the fibers decreases.

Using equation 2 above for peeling rate of 1 mm/s and stage speed 0.1 cm/s, the strain energy contribution ($U_S$) was determined to be 38.8 µJ. The total work expended in peeling the disc was determined by calculating the area of the force-distance measurements shown in FIGS. 7A-C For the calculated values for a peeling rate 1 mm/s and collector speed 0.1 cm/s seen as triangles in FIG. 7A ($W_T$=893 µJ). The difference in $W_T$−$U_S$ was 854.2 µJ, which is the adhesion energy, $U_P$. The ratio Up/Us was also examined in order to estimate the importance of the peeling and stretching terms for synthetic discs prepared. To account for the different peeling lengths Lo, the contribution of the energy terms were compared between discs of different spacings peeled at the same rate. Additionally, to compare the trends, the energy values were normalized with respect to the $L_0$, as shown in FIGS. 12A-B and Table 1. Since there is a variation in the lengths peeled for 0.01 mm/s within different spacings due to experimental limitations, the values for this peeling speed could not be compared. For peel rates of 1 mm/s and 0.1 mm/s, the energy contribution terms normalized by $L_0$ increase as the spacing between the fibers reduces. The total energy expended in peeling ($U_T/L_0$) being proportional to the adhesion force recorded, was maximum for discs prepared at slowest collector speed (0.1 cm/s) while the adhesion energy contribution ($U_P$) dominated over the strain energy contribution ($U_S$) in all the discs studied.

Example 3

Effect of Substrate Surface Energy

To test the effects of surface energy of the substrate on the peel force and shape of deformation zone, the surface energy of the aluminum substrate was modified by plasma polymerization and oxygen plasma and compared its behavior with the untreated substrates. A precursor 1H, 1H,2H-perfluoro-1-dodecene ($C_{10}F_{21}$—CH=$CH_2$) (referred as perfluoro henceforth) was chosen for fabricating low surface energy surfaces (7.5 mN-m-1) using the procedure is described by Badge et al. Langmuir 2011, 27, 14726-31, the disclosure of which is hereby incorporated by reference in its entirety. As a comparison, high-energy surfaces were fabricated by exposing the aluminum substrate to oxygen plasma. The static water contact angles (θy) measured were 1100±20, 890±10 and 00 for perfluoro plasma treated, untreated and oxygen plasma treated substrates, respectively. The polyurethane fibers were electrospun on the three different substrates, using the collector stage velocity of 0.1 cm/s. In case of oxygen plasma treated substrates, the electrospinning was performed within an hour of substrate preparation, in order to minimize the loss of the efficacy of the oxygen plasma. A summary of the fiber parameters, peeling forces and fracture width related to synthetic discs prepared on different substrates at a collector velocity of 0.1 cm/s and peeling rate 1 mm/s is provided in Table 2. The parameters such as spacing and diameter (see Table 2) were consistent in the three cases, so the comparison of peel forces was justified.

TABLE 2

| | Substrate | | |
|---|---|---|---|
| Parameter | Perfluoro plasma treated aluminum | Untreated aluminum | Oxygen plasma treated aluminum |
| Diameter (µm) | 1.5 ± 0.2 | 1.3 ± 0.2 | 1.5 ± 0.5 |
| Spacing (µm) | 15 ± 8 | 17 ± 4 | 15 ± 3 |
| Contact angle (°) | 109 ± 2 | 89 ± 1 | 0 |
| Force (mN) | 54 ± 6 | 58 ± 3 | 22 ± 9 |
| Fracture width (µm) | 4021 ± 319 Max:<br>7984 ± 637 Min:<br>59 ± 2 | 3407 ± 274 Max:<br>6760 ± 545 Min:<br>54 ± 2 | 903 ± 129 |
| $U_T/L_0$ | 65.9 | 49.6 | 29.3 |
| $U_S/L_0$ | 3.1 | 2.2 | 2.6 |
| $U_P/L_0$ | 62.8 | 47.4 | 26.7 |
| $U_p/U_s$ | 20.2 | 21.5 | 10.2 |

Figure 15:
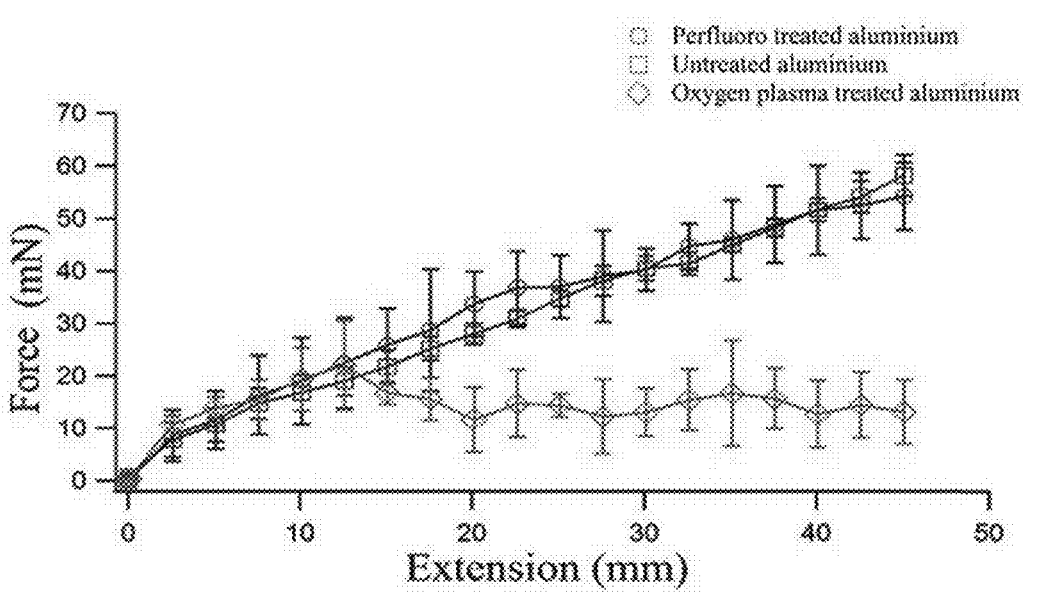
FIG. 15 is a graph showing the peel force behavior for synthetic discs of adhesive nanofibers according to at least one embodiment of the present invention on three different substrates. The open circles, squares and diamonds represent the peel forces shown by perfluoro treated, untreated and oxygen plasma treated aluminum substrates, respectively. The data are plotted as mean±standard deviation from a set of five measurements.

The deformation zones seen after peeling at 1 mm/s from perfluoro plasma treated, untreated and oxygen plasma treated substrates are shown in FIGS. 13A-C, respectively, while the results for the peel force are shown in FIG. 15. As seen from the force extension curve and the peeling behavior on different substrates, it is evident that a larger deformation zone is associated with higher adhesion force, as predicted by the energy model described previously. FIG. 15 depicts that the peel force in perfluoro and untreated substrates does not reach the steady state, due to stretching of fibers and formation of V-shape zone in addition to insufficient substrate length, while a plateau is reached in oxygen plasma treated substrates owing to a narrow zone of deformation. Thus, the measured adhesion forces for perfluoro and untreated samples were 54±6 mN and 58±3 mN, respectively while the steady state force equal to 22±9 mN was measured for oxygen plasma treated substrates.

The deformation widths for the three substrates are reported in Table 2. The higher adhesion force and larger deformation zone (V-shaped) for perfluoro plasma treated substrate demonstrates that the polyurethane fibers stretched more as they were peeled from the low energy substrate. In contrast, peeling from the high surface energy substrate (oxygen plasma treated) showed a narrower deformation zone (accompanied by sharp edges and corners due to breakage of the polyurethane fibers) and a lower adhesion force. Additionally, in the case of oxygen plasma treated substrates, two other types of peel zone formation (see FIG. 16) were occasionally seen. One of these started as a V-shaped zone forming and narrowed down as it was peeled further, while the other resembled the behavior seen in untreated samples. This infrequent behavior can be due to the variation in the oxygen plasma treatment. The untreated aluminum samples show a similar trend in peeling behavior as perfluoro plasma treated substrates. The contributions of the energy terms for the different surfaces have been depicted in FIG. 14 and Table 2. The perfluoro plasma treated substrates showed higher overall energy values due to higher adhesion forces generated while peeling the fibers. In contrast, the oxygen plasma treated surfaces showed lower adhesion forces due to firmly stuck fibers on the treated substrate.

Example 4

Evaluation of Nylon 6 Adhesive Fibers

Figure 17A:
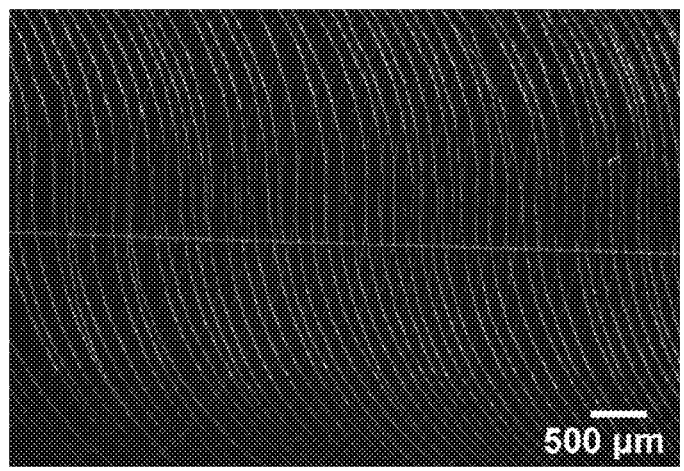
FIG. 17A and FIG. 17B show the variation in the spacing of patterns made at collection stage velocities of 2.5 cm/s (FIG. 17A) and 0.1 cm/s (FIG. 17B).
Figure 17B:
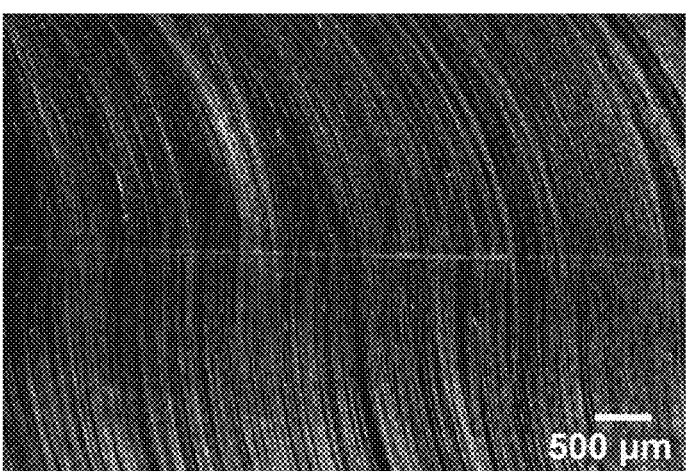
Figure 17C:
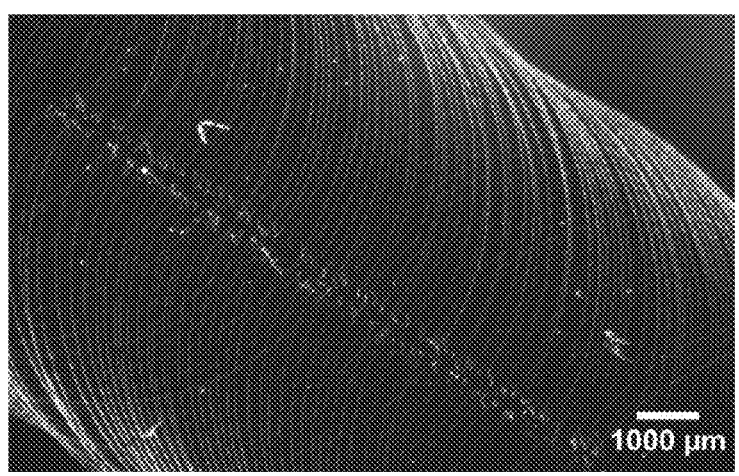
FIG. 17C shows the deformation zone seen after the disc made at collector stage velocity 2.5 cm/s was peeled by hand. The scale bar for FIGS. 16A and 17B is 500 μm and for FIG. 17C, it is 1000 μm.

Adhesive nanofibers made by electrospinning relatively brittle (tip-to-collector distance of 0.5 cm) Nylon 6 threads instead of polyurethane were used to illustrate the importance of the material properties of the nanofibers (see FIGS. 17A-C). In the electrospun Nylon 6 synthetic discs, the pull-off forces were so low that the underlying thread would peel off even before it could be mounted on the synthetic disc on the force sensor. The peel zone width was very small (see FIG. 17C) and the underlying nylon thread peeled off by cutting through the Nylon 6 electrospun threads. The low toughness and flexibility of the electrospun nylon 6 fibers (1-2 orders of magnitude lower than polyurethane electrospun fibers) resulted in very small energy dissipation during the peeling process, emphasizing that the role of the material is also critical in optimizing the adhesion forces.

What is claimed is:

1. A method of attaching a fiber, thread, or other long, thin material to a surface comprising:
   (A) placing a length of a fiber thread, or other long, thin material on a surface thereby defining a first area of said surface on a first side of said fiber and a second area of said surface on an opposite side of said fiber;
   (B) providing an adhesive fiber generating apparatus, wherein the output of said adhesive fiber generating apparatus is oriented to generate one or more adhesive fibers over said fiber thread, or other long, thin material and said first and second areas of said surface;
   (C) generating one or more adhesive fibers over said fiber thread, or other long, thin material wherein said adhesive fibers are generated onto said first and second areas of said surface and across said fiber thread, or other long, thin material; and
   (D) moving one of said surface and said output of the adhesive fiber generating apparatus relative to the other in a direction substantially parallel with the orientation of said fiber thread, or other long, thin material on said surface wherein said one or more adhesive fibers further comprise a plurality of segments running between the first and the second areas of said surface and across said fiber thread, or other long, thin material, thereby attaching said fiber thread, or other long, thin material to said surface.

2. The method of claim 1 wherein said fiber thread, or other long, thin material comprises a material selected from the group consisting of natural and synthetic fibers such as nylon, cotton, wool, silkworm silk, natural dragline silk, polyester, polyethylene, carbon fiber, glass fiber, synthetic spider silk and combinations thereof.

3. The method of claim 1 wherein said fiber thread, or other long, thin material has a diameter of from about 1 μm to about 2000 μm.

4. The method of claim 1 wherein said adhesive fiber generating apparatus generates said one or more adhesive fibers using a method selected from the group consisting of electrospinning, Nanofibers by Gas Jet (NGJ), melt blowing, rotary jet spinning, gas jet fibers (GJF) and combinations thereof.

5. The method of claim 1 wherein said adhesive fiber generating apparatus generates said one or more adhesive fibers by electrospinning.

6. The method of claim 1 wherein said one or more adhesive fibers is generated from a polymer selected from the group consisting of thermoplastic polyurethane, polyesters, natural silk fibroin, synthetic spider silk, polyvinyl alcohol, polymethacrylates, polylactic acid (PLA), collagen-polyethylene oxide blend, silk-polyethylene oxide blend, chitosan, gelatin, polyethylene glycol (PEG), poly(lactide-co-glycolide) (PLGA), polycaprolactone, polyethylene-co-vinyl acetate (PEVA) and combinations thereof.

7. The method of claim 1 wherein said one or more adhesive fibers is generated from a thermoplastic polyurethane.

8. The method of claim 1 wherein said one or more adhesive fibers has a diameter of from about 10 nm to about 100 μm.

9. The method of claim 1 wherein said one or more adhesive fibers has a surface energy of from about 10 to about 40 mJ/m$^2$.

10. The method of claim 1 wherein said surface is selected from the group consisting of aluminum, stainless steel, silicon, glass, plastic, bone, skin and combinations thereof.

11. The method of claim 1 wherein said surface has a surface energy of from about 10 to about 3000 mJ/m$^2$.

12. The method of claim 1 wherein the mean distance between said segments running between the first and the second areas of said surface and across said fiber is from 0.5 μm to about 5000 μm.

13. The method of claim 1 wherein said one of said surface and said output of the adhesive fiber generating apparatus moves relative to the other at a speed of from about 0.1 mm/second to about 1000 mm/second.

14. A synthetic attachment disc for attaching a fiber or other long, thin material to a surface comprising a plurality of synthetic adhesive fibers extending from a first area of said surface, across and substantially perpendicular to a fiber thread, or other long, thin material to be attached to said surface, and onto a second area of said surface, wherein said plurality of adhesive fibers adhere to said surface thereby securing said fiber thread, or other long, thin material to said surface.

15. The synthetic attachment disc of claim 14 wherein said fiber thread, or other long, thin material comprises a polymer selected from the group consisting of nylon, cotton thread, natural fibers, synthetic fibers, nylon, cotton, wool, silkworm silk, natural dragline silk, polyester, polyethylene, carbon fiber, glass fiber, synthetic spider silk, and combinations thereof.

16. The synthetic attachment disc of claim 14 wherein said fiber thread, or other long, thin material has a diameter of from about 1 μm to about 2000 μm.

17. The synthetic attachment disc of claim 14 wherein said plurality adhesive fibers have a surface energy of from about 10 to about 40 mJ/m$^2$.

18. The synthetic attachment disc of claim 14 wherein said plurality of synthetic adhesive fibers are comprised of a polymer selected from the group consisting of thermoplastic polyurethane, polyesters, natural silk fibroin, synthetic spider silk, polyvinyl alcohol, polymethacrylates, polylactic acid (PLA), collagen-polyethylene oxide blend, silk-polyethylene oxide blend, chitosan, gelatin, polyethylene glycol (PEG), poly(lactide-co-glycolide) (PLGA), polycaprolactone, polyethylene-co-vinyl acetate (PEVA) and combinations thereof.

19. The synthetic attachment disc of claim 14 wherein said plurality of synthetic adhesive fibers are comprised of a thermoplastic polyurethane.

20. The synthetic attachment disc of claim 14 wherein said plurality of synthetic adhesive fibers have a mean diameter of from about 10 nm to about 100 μm.

21. The synthetic attachment disc of claim 14 wherein the mean distance between each one of said plurality of synthetic adhesive fibers is from 0.5 μm to about 5000 μm.

22. The synthetic attachment disc of claim 14 wherein the ratio of the mean length of said plurality of synthetic adhesive fibers to diameter of said fiber thread, or other long, thin material is from about 10 to about $10^6$.

23. The synthetic attachment disc of claim 14 wherein said plurality of synthetic adhesive fibers are segments of a coil formed by one or more synthetic adhesive fibers.

24. A synthetic attachment disc for attaching a fiber, thread, or other long, thin material to a surface formed using the method of claim 1.

\* \* \* \* \*